US 7,499,436 B2

(12) United States Patent
Ikeda et al.

(10) Patent No.: US 7,499,436 B2
(45) Date of Patent: Mar. 3, 2009

(54) MOBILE COMMUNICATION SYSTEM USING RESOURCE RESERVATION PROTOCOL

(75) Inventors: Eiji Ikeda, Kawasaki (JP); Tomonori Kumagai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1035 days.

(21) Appl. No.: 10/301,054

(22) Filed: Nov. 21, 2002

(65) Prior Publication Data

US 2003/0214910 A1 Nov. 20, 2003

(30) Foreign Application Priority Data

May 20, 2002 (JP) ............................. 2002-144883

(51) Int. Cl.
*H04J 3/14* (2006.01)
*H04M 11/00* (2006.01)
*G06F 15/173* (2006.01)

(52) U.S. Cl. .................. 370/338; 370/328; 370/332; 370/352; 370/401; 370/468; 455/405; 455/450; 455/509; 709/224; 709/225

(58) Field of Classification Search ......... 370/328–338, 370/401, 231, 235, 352, 458, 468; 709/225, 709/223, 227; 455/450, 405, 509
See application file for complete search history.

(56) References Cited

U.S. PATENT DOCUMENTS 6,570,851 B1 * 5/2003 Koskelainen et al. ........ 370/231
6,654,610 B1 * 11/2003 Chen et al. ................... 455/450
6,714,987 B1 * 3/2004 Amin et al. .................. 709/249
6,745,125 B2 * 6/2004 Saraga et al. ................ 701/207
6,912,489 B1 * 6/2005 Luitwieler ....................... 703/1
7,006,472 B1 * 2/2006 Immonen et al. ............. 370/332
7,020,465 B2 * 3/2006 O'Neill .................... 455/432.1
7,027,400 B2 * 4/2006 O'Neill ........................ 370/235
7,082,116 B2 * 7/2006 Reza et al. .................... 370/338
7,287,070 B2 * 10/2007 Shaheen et al. .............. 709/223
2001/0027490 A1 * 10/2001 Fodor et al. .................. 709/238

(Continued)

FOREIGN PATENT DOCUMENTS

JP           11-103303         4/1999

(Continued)

OTHER PUBLICATIONS

Ping Pan and Henning Schulzrinne, Staged Refresh Timers for RSVP, Global Telecommunication Conference, 1997, GLOBECOM 97, IEEE.*

*Primary Examiner*—Edan Orgad
*Assistant Examiner*—Venkatesh Haliyur
(74) *Attorney, Agent, or Firm*—Katten Muchin Rosenman LLP

(57) ABSTRACT

A mobile communication system includes a mobile communication network connected to a core network (CN) and a plurality of radio network nodes included in the mobile communication network (RAN). Network resources for a data flow between a data transmission node and a data reception node that passes through the CN and RAN are reserved on the basis of RSVP. A region for refreshing a reservation state of network resources concerning the flow is divided into a CN side and an RAN side by taking a predetermined radio network node through which the flow passes as a boundary. Refreshment on the RAN side is conducted with a frequency higher than that of refreshment on the CN side.

9 Claims, 14 Drawing Sheets

U.S. PATENT DOCUMENTS

| | | | |
|---|---|---|---|
| 2002/0062192 A1* | 5/2002 | Saraga et al. | 701/207 |
| 2002/0085528 A1* | 7/2002 | Reza et al. | 370/338 |
| 2002/0087699 A1* | 7/2002 | Karagiannis et al. | 709/227 |
| 2002/0126701 A1* | 9/2002 | Requena | 370/469 |
| 2002/0138729 A1* | 9/2002 | Miettinen et al. | 713/173 |
| 2002/0147717 A1* | 10/2002 | Barros et al. | 707/7 |
| 2002/0162106 A1* | 10/2002 | Pickover et al. | 725/42 |
| 2002/0178247 A1* | 11/2002 | Shaheen et al. | 709/223 |
| 2003/0074443 A1* | 4/2003 | Melaku et al. | 709/224 |
| 2004/0008632 A1* | 1/2004 | Hsu et al. | 370/252 |

FOREIGN PATENT DOCUMENTS

| | | |
|---|---|---|
| JP | 2001-111613 | 4/2001 |
| JP | 2001-224070 | 8/2001 |

* cited by examiner

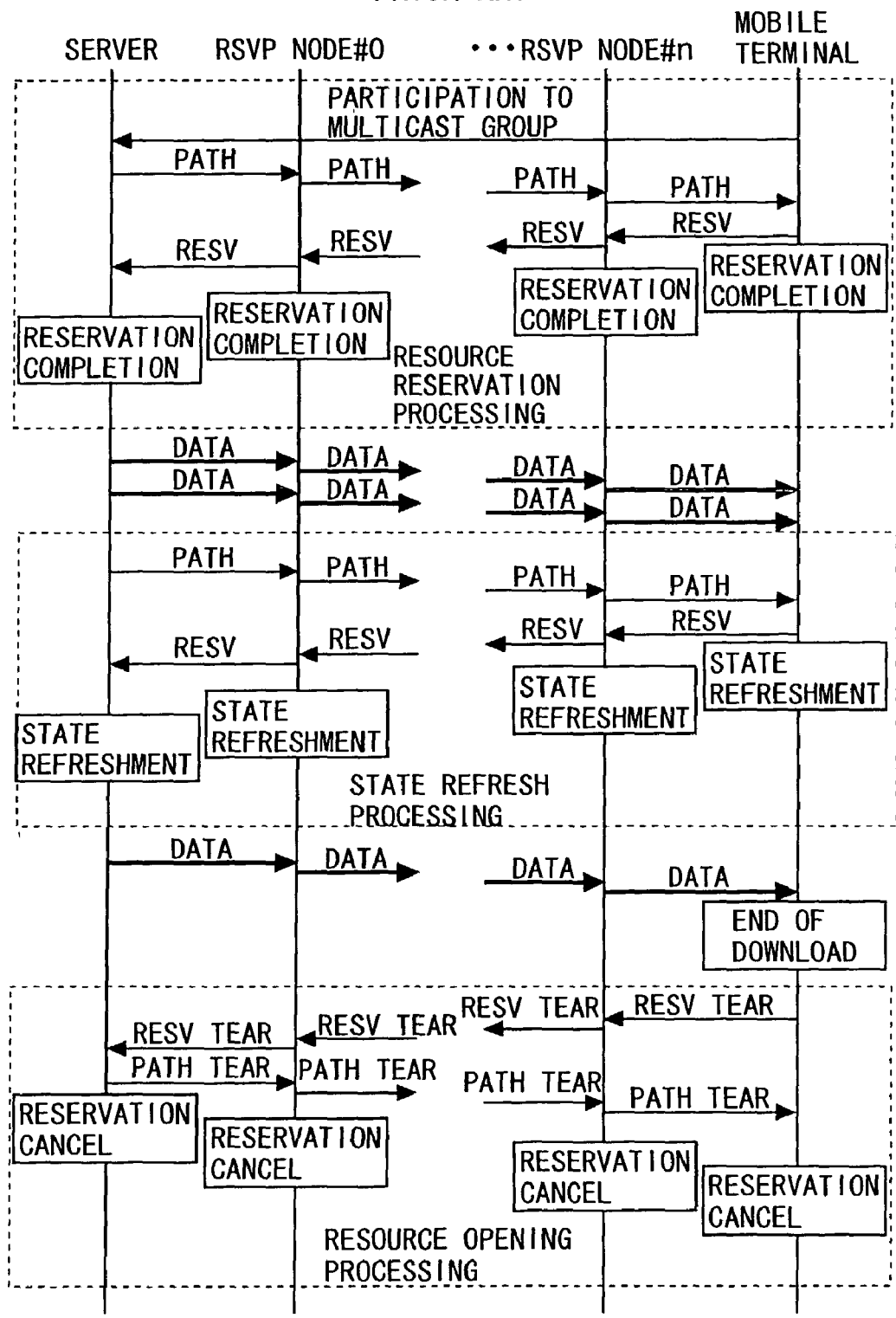

THE CASE WHERE REFRESH PERIOD IS LONG

THE CASE WHERE REFRESH PERIOD IS SHORT

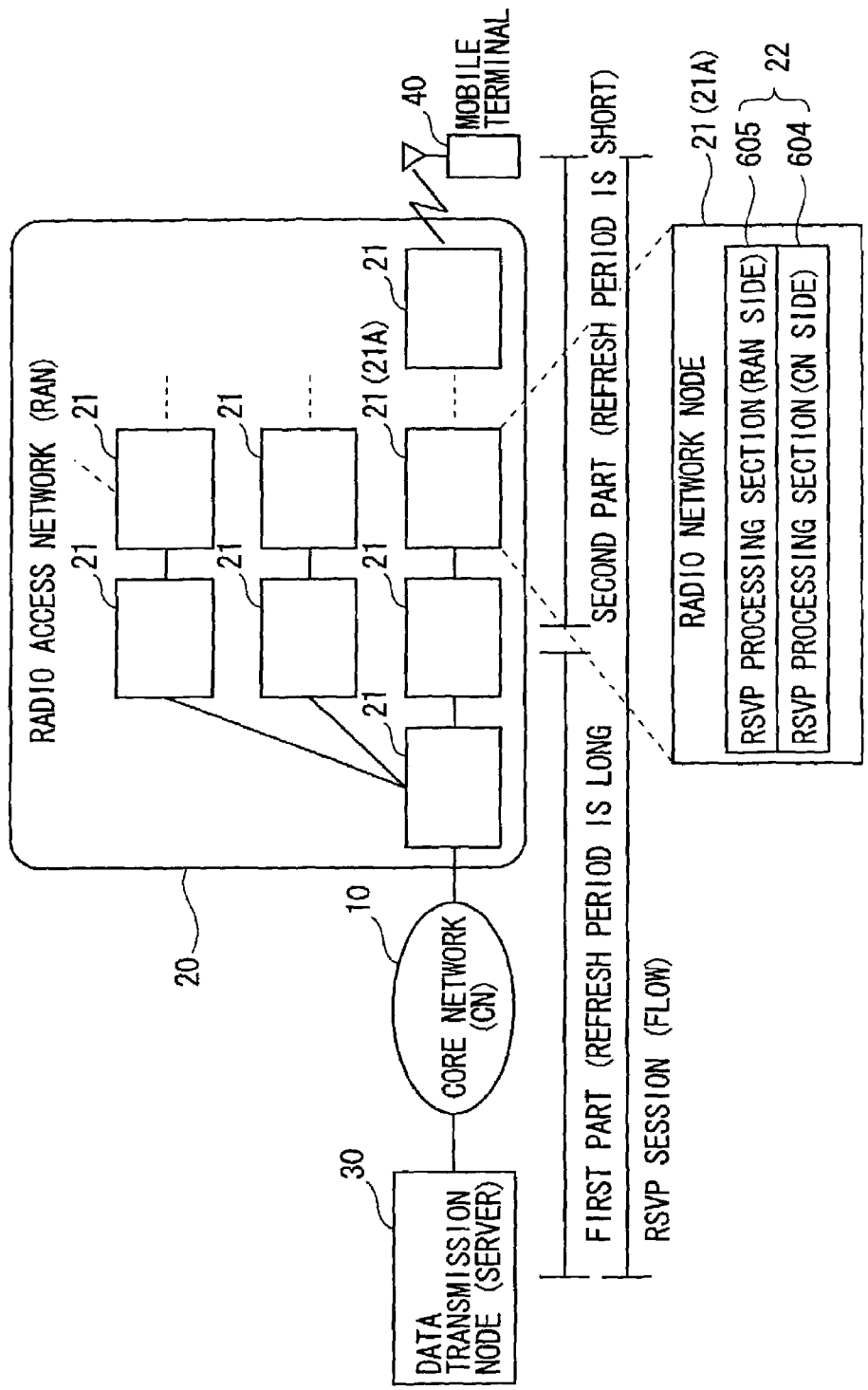

MOBILE COMMUNICATION SYSTEM USING RESOURCE RESERVATION PROTOCOL

BACKGROUND OF THE INVENTION

1. Field of the Invention

The present invention relates to a resource control method in a mobile communication system using a resource reservation protocol (RSVP).

2. Description of the Related Art

With rapid growth of the mobile communication technique in recent years, the data transfer rate in a radio section has been greatly increased. Besides conventional service, such as speech or low rate packet communication, therefore, delivery of a large capacity of real time data, such as video data or music data is about to become possible. It is considered that a wide variety of services using large capacity communication techniques will be provided. For implementing large capacity service while ensuring its quality, it is demanded to ensure a requested quality (QoS) not only in radio sections but also in all nodes in a network.

The resource reservation protocol (RSVP) is one of protocols for ensuring QoS at the time of communication. IETF (Internet Engineering Task Force) is prescribed by RFC 2205. In the RSVP, a unit of communication in a certain end-to-end is defined as session and a data stream in each session is defined as flow. The RSVP is a protocol for previously ensuring network resources, such as abandwidth, in all nodes in a network through which a flow passes. A flow reception system exchanges RSVP messages with a transmission system. In this process, resources on all nodes (such as routers in an IP network) that exist between the reception system and the transmission system are reserved. Furthermore, in the RSVP, reservation states in each node are managed by using an "RSVP soft state" so as to be capable of flexibly coping with a dynamic network such as an IP network. The RSVP soft state is always updated to the latest state by a periodically issued refresh message. The RSVP is used mainly in IP networks. There are no examples of use of RSVP in mobile communication systems. Concrete implementation methods and problems are not yet made clear in many respects.

Supposing that the RSVP is applied to a current mobile communication system, a system example is schematically shown in FIG. 1. A mobile terminal 106 accesses a server 100 via a core network (CN) 101 and a radio access network (RAN) 102 formed of radio network nodes 103 to 105, and conducts data down loading. The RSVP is mounted on each of nodes in the core network 101. And the RSVP is mounted on each of the radio network nodes 103 to 105 as well. An operation conducted in such a system from the time when the mobile terminal 106 starts downloading of data from the server 100 until the downloading is finished will now be described briefly.

FIG. 2 is a diagram showing a processing sequence of the RSVP. FIG. 2 shows how a mobile terminal downloads data delivered from a server. Processing concerning the RSVP can be divided into the following three main classes:

(1) resource reservation processing on download path at the time of session start;

(2) refresh operation of soft state in downloading;

(3) resource deletion processing at the time of session end.

At the time of session start, the mobile terminal conducts processing for participating in a data delivery group by using a suitable protocol. Upon accepting this processing, the server transmits a RSVP message called "PATH" that stores route information (path reservation contents) concerning a flow to the mobile terminal. The PATH message is decoded on all RSVP nodes (nodes mounting the RSVP in the core network 101 and radio network nodes mounting the RSVP shown in FIG. 1) on the way to the mobile terminal to establish a PATH state (path reservation state), which is one of RSVP soft states, on the RSVP nodes. Upon receiving the PATH message, the mobile terminal transmits a RSVP message called "RESV" that stores information (resource reservation contents) concerning resource reservations to the server. In the same way as the PATH message, the RESV message is decoded on all RSVP nodes on the way to the server to establish a RESV state (resource reservation state), which is one of RSVP soft states, on the RSVP nodes. In this way, exchange of the PATH message and the RESV message is conducted between the mobile terminal and the server. As a result, resource reservations on all nodes that exist on the path between the mobile terminal and the server are completed.

Upon completion of resource reservations, the server starts data transmission to the mobile terminal. During that time, the RSVP resource reservation state (RSVP soft state) on each node is always updated (refreshed) to the latest information. On the basis of a timer (refresh timer) determined by the RSVP, therefore, the server periodically transmits the PATH message to the mobile terminal, and the mobile terminal periodically transmits the RESV message to the server. Even if the flow route is dynamically changed by a movement of the mobile terminal or a failure of a network node or a resource reservation request (resource reservation contents) is altered by the mobile terminal, therefore, the resource reservation state can always follow it.

In the case where the session is finished, the mobile terminal sends a RSVP message called "RESV TEAR" to the server and the server sends a RSVP message called "PATH TEAR" to the mobile terminal. Upon receiving the RESV TEAR message and the PATH TEAR message, each node on the session conducts deletion processing of the resource reservation state and the path state on the node.

Although not shown in FIG. 2, it is not always necessary to transmit the RESV TEAR message and the PATH TEAR message at the time of end of the session, because the reservation state of each node is deleted autonomously if a refresh message is not received within a predetermined time.

As described above, the resource reservation state in each node on the path (flow) is always updated to its latest state. This aims at always ensuring optimum QoS with respect to the data flow in a dynamically changing network environment. At fixed time intervals or whenever the reservation state changes, therefore, the server and the mobile terminal must transmit a PATH message or a RESV message (which may also be collectively referred to as "refresh message"). In the mobile communication system, the refresh operation especially poses a problem.

The property of the mobile communication system differs from that of the ordinary communication system in that the position of the terminal device (mobile terminal) is frequently changed. In other words, if the mobile terminal changes its position, a change of the path route or a change of the radio state occurs. Even after resources required in the network have been reserved between the mobile terminal and the server, therefore, the reservation state must be frequently refreshed according to a state change caused by a movement of the mobile terminal. In addition, as described above, the exchange of the refresh message must be conducted steadily even in the case where the reservation state does not change.

In the mobile communication system thus expected to frequently change in communication route and radio state, the transmission interval of the refresh messages must be extremely short for the resource reservation state to follow the changes in these states.

For these reasons, a great deal of refresh messages are exchanged between the mobile terminal and the server shown in FIG. 1. Thereupon, there is a possibility that the refresh operation will exert pressure upon resources of the core network and the mobile communication network.

Furthermore, data delivery nodes (data transmission/reception nodes) such as servers typically exist in the core network. In such a case, it may occur that the reservation state is actually altered in only a portion near a mobile terminal even if refresh messages are frequently exchanged between the server and the mobile terminal. In this case, the reservation state in each node in the core network is not altered at all, and only the same reservation state is simply updated, because the topology in the core network is considered not to change frequently as compared with the radio access network. Even if each node in the core network receives refresh messages, therefore, network resources are merely consumed wastefully.

In other words, if the refresh period in the resource reservation state in the mobile communication system shown in FIG. 1 is set to be short so as to conform to the radio access network, the reservation state can properly follow the state change of the radio access network. However, wasteful refresh messages flow into the core network, and waste network resources (see FIG. 3(A)). On the other hand, if the refresh period is set to be long in conformity with the core network, wasteful refresh messages reduce in the core network. However, it becomes impossible for the reservation state to follow the state change of the radio access network (see FIG. 3(B)).

As heretofore described, if it is attempted to mount the RSVP in the mobile communication system, it is necessary to satisfy two contradictory requests simultaneously. In other words, on a side located near the mobile terminal on the same path, it is necessary to frequently exchange refresh messages due to the mobility of the mobile terminal. On the other hand, on a side located near the server, it is necessary to, on the contrary, suppress refresh messages to minimum and save network resources.

SUMMARY OF THE INVENTION

An object of the present invention is to provide a mobile communication system using RSVP capable of making the network resource reservation state flexibly following the state change of the network and efficiently using network resources.

The present invention adopts the following configurations in order to achieve the object.

In accordance with the present invention, there is provided a mobile communication system using a resource reservation protocol comprising: a mobile communication network connected to a core network implementing a resource reservation protocol, a plurality of radio network nodes included in the mobile communication network, means for reserving network resources for a data flow between a data transmission node and a data reception node that passes through the core network and the mobile communication network, on the basis of a resource reservation protocol, and refresh control means for dividing a region for refreshing a reservation state of network resources concerning the flow into a core network side and a mobile communication network side by taking a predetermined radio network node through which the flow passes as a boundary, and conducting refreshment on the mobile communication network side with a frequency higher than that of refreshment on the core network side.

According to the present invention, the refresh control means conducts refreshment on the mobile communication network side with a frequency higher than the core network side. As a result, it is possible to make the reservation state of the mobile communication network side follow the state change of the mobile communication network. On the other hand, since the refresh frequency of the core network side is suppressed as compared with the mobile communication network side, it is possible to suppress the waste of network resources caused by transfer of wasteful refresh messages.

In accordance with the present invention, the refresh control means preferably conducts refreshment on the mobile communication network side with a period shorter than that on the core network side.

In accordance with the present invention, the mobile communication system preferably further includes boundary node alteration means for altering a boundary node serving as the radio network node that forms the boundary, according to a state change of the mobile communication network with respect to the flow.

By doing so, the size of the mobile communication network side where refreshment is conducted frequently can be controlled according to a change of the state of the mobile communication network. As a result, the region that needs frequent exchange of refresh messages can be made small as far as possible. Therefore, network resources in the mobile communication network can be used efficiently.

In accordance with the present invention, when the number of times the reservation state of network resources is changed on the mobile communication network side obtained by a current boundary node within a predetermined time has exceeded an upper limit value, the boundary node alteration means preferably alters another radio network node that exists on the core network side as compared with the current boundary node, to a boundary node.

In accordance with the present invention, when the number of times the reservation state of network resources is changed on the mobile communication network side obtained by a current boundary node within a predetermined time has become less than a lower limit value, the boundary node alteration means preferably alters another radio network node that exists on the mobile communication network side as compared with the current boundary node, to a boundary node.

According to the present invention, it is possible to make the reservation state of network resources flexibly follow the state change of the network. In addition, it becomes possible to efficiently use the network resources.

BRIEF DESCRIPTION OF THE DRAWINGS

FIG. 2 is a diagram showing a RSVP processing message in a system shown in FIG. 1;

FIG. 4 is a diagram showing an embodiment of a mobile communication system according to the present invention;

DESCRIPTION OF THE PREFERRED EMBODIMENTS

Figure 1:
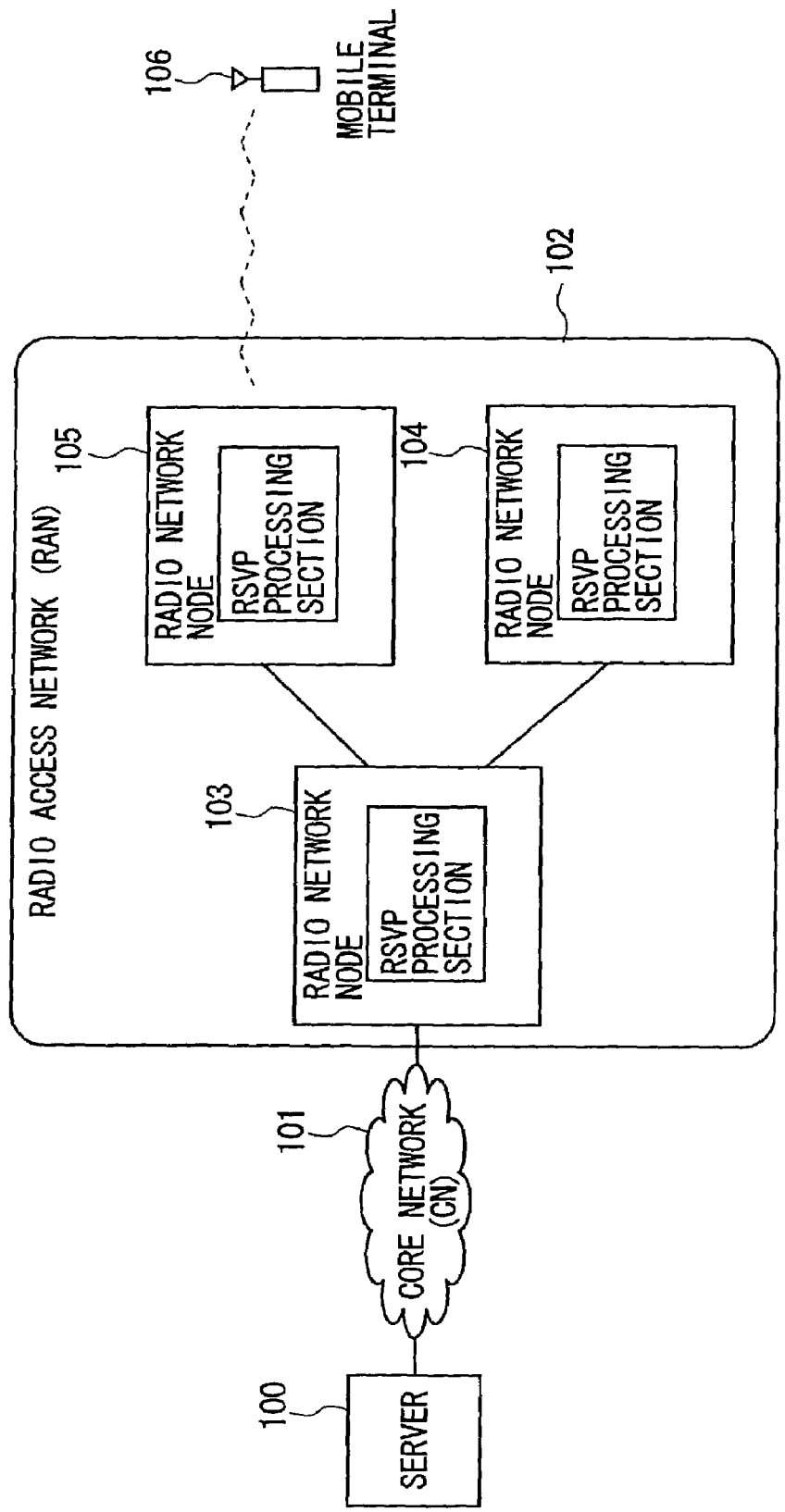
FIG. 1 is a diagram showing an example of the case where a RSVP is used in a mobile communication system.
Figure 3B:
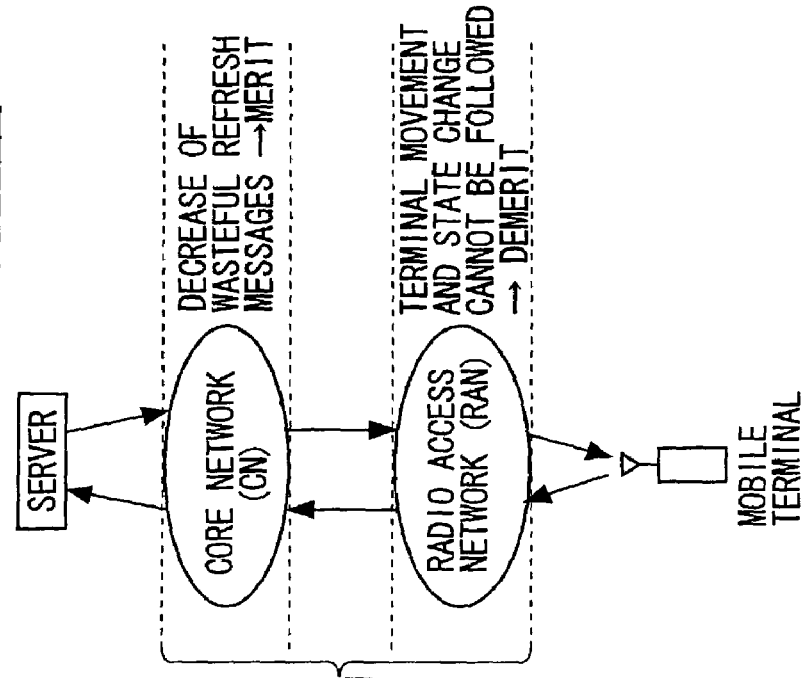
FIGS. 3(A) and 3(B) are diagrams showing RSVP networks based on a conventional scheme.
Figure 3A:
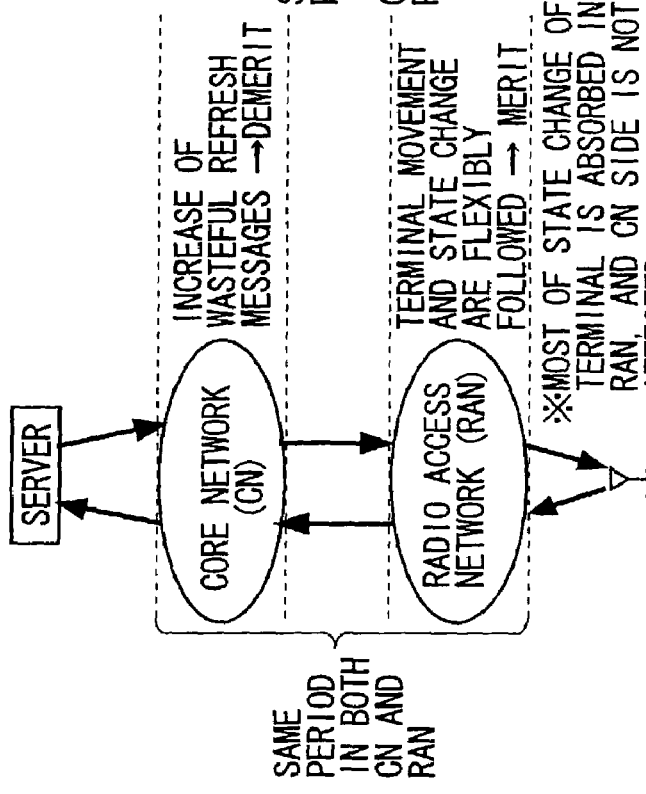

Hereafter, embodiments of the present invention will be described with reference to the drawings. Configurations of the embodiments are exemplary, and the present invention is not limited to the configurations of the embodiments.

[Outline]

FIG. 4 is a diagram showing an example of a mobile communication system according to the present invention. In FIG. 4, the mobile communication system includes a core network (CN) 10 and a radio access network (RAN) 20. The CN 10 includes a plurality of nodes (not illustrated). The RAN 20 includes a plurality of radio network nodes 21 (a radio network node group located between the CN 10 and a mobile terminal 40).

The CN 10 accommodates (i.e., is connected to) a data transmission and reception node 30 (such as a server for delivering data, which is hereafter simply referred to as node 30). When the node 30 conducts data communication with a mobile terminal 40 connected to the RAN 20 via the CN 10 and the RAN 20, for example, data (packets) transmitted from the node 30 are transferred to the mobile terminal 40 through a transfer route (a path or a flow) in the CN 10 and the RAN 20 determined on the basis of destination information such as an IP destination address.

The data path (flow) passes through at least one node in the CN 10 and at least one radio network node 21 in the RAN 20. Upon receiving the data transmitted from the node 30, the node in the CN 10 and the radio network node 21 the path passes through (i.e., located on the path) transfer the data to a node (next node) corresponding to the next hop on the basis of destination information (IP destination address) added to the data. Such transfer processing is conducted in each node located on the path. As a result, the data from the node 30 arrives at the mobile terminal 40. When transferring data from the mobile terminal 40 to the node 30, similar operation is conducted.

With respect to the above described data communication (data transmission and reception), each of nodes through which the path (flow) passes reserves network resources concerning the path by using the RSVP in order to ensure desired QoS. Furthermore, each node refreshes the resource reservation state. For that purpose, each of the nodes in the CN 10 and radio network nodes 21 in the RAN 20 mounts a function serving as means for reserving network resources for the flow on the basis of the RSVP.

When resource reservation processing is conducted with respect to a flow for transmitting data from the node 30 to the mobile terminal 40, a PATH message is transmitted from the node 30 toward the mobile terminal 40 and a RESV message is transmitted from the mobile terminal 40 toward the node 30. Furthermore, the node 30 periodically transmits a PATH message for refreshing the reservation state (PATH state) toward the mobile terminal 40, and the mobile terminal 40 periodically transmits a RESV message for refreshing the reservation state (RESV state) toward the node 30.

On the other hand, when resource reservation processing is conducted with respect to a flow for transmitting data from the mobile terminal 40 to the node 30, a PATH message is transmitted from the mobile terminal 40 toward the node 30 and a RESV message is transmitted from the node 30 toward the mobile terminal 40. Furthermore, the mobile terminal 40 periodically transmits a PATH message for refreshing the reservation state (PATH state) toward the node 30, and the node 30 periodically transmits a RESV message for refreshing the reservation state (RESV state) toward the mobile terminal 40.

In other words, a node corresponding to an upstream end of the flow transmits a PATH message toward a node corresponding to a downstream end, and the node corresponding to the downstream end transmits a RESV message toward the node corresponding to the upstream end of the flow.

Therefore, each of the nodes in the CN 10 and the RAN 20 receives the PATH message from the upstream side of the flow and receives the RESV message from the downstream side of the flow. In the ensuing description, a flow for transmitting data from the node 30 (data transmission node) toward the mobile terminal 40 (data reception node) is supposed. However, the present invention can also be applied to resource reservation processing with respect to a flow for transmitting data from the mobile terminal 40 (data transmission node) to the node 30 (data reception node).

In other words, the present invention is applied to a data flow passing through a core network and a mobile communication network between a data transmission node and a data reception node. The transmission direction of the data of the data flow at this time doesn't matter.

Each of the nodes in the CN 10 and radio network nodes 21 in the RAN 20 conducts the following operation as refresh operation of the reservation state. Upon receiving a RSVP message for refreshing (a PATH message or a RESV message, which is hereafter referred to as "refresh message" when collectively denoted) from the node 30 and/or the mobile terminal 40, each node transfers the refresh message to a node corresponding to the next hop. If at this time there is a change (such as a network topology (path route) alteration or a resource reservation request (content) alteration), then reservation processing of network resources for ensuring its reservation state is executed, In the mobile communication system according to the present invention, a region for conducting resource reservation processing with respect to a path that passes through the CN 10 and the RAN 20, such as a data path (flow) between the node 30 and the mobile terminal 40, is divided into a node 30 side (CN side) and a mobile terminal 40 side (RAN side) opposite to the node 30 side with a predetermined radio network node 21 on the path set as the boundary, and independent resource reservation processing is conducted in each of the regions.

In other words, the predetermined radio network node 21 on the path conducts resource reservation processing (including refreshing) of the CN side with the node 30, and conducts resource reservation processing (including refreshing) of the RAN side with the mobile terminal 40. Hereafter, there radio network node 21 serving as the boundary between the two regions is referred to as "boundary node" when the occasion demands.

And the boundary node conducts refreshing on the resource reservation state of the RAN side at a frequency higher than that of refreshing on the resource reservation state of the CN side. In this way, the mobile communication system has refresh control means. As a result, the refresh message transmission interval on the CN side can be made different from that on the RAN side, and the reservation state refreshing can be conducted at frequencies according to the CN 10 and the RAN 20.

On the CN side, transmission and reception of wasteful refresh messages are suppressed. On the CN side, therefore, efficient use of network resources and reduction of the processing load on the node can be attained. On the other hand, on the RAN side, the transmission and reception (exchange) of refresh messages are conducted frequently. On the RAN side, therefore, it is possible to make the resource reservation state follow the state change of the RAN 20 or a reservation content change caused by a movement or the like of the mobile terminal 40.

Thus, QoS of communication between the node 30 and the mobile terminal 40 can be ensured, and communication service of a stable quality can be provided.

Furthermore, in the case where a path (flow) between the node 30 and the mobile terminal 40 passes through a plurality of radio network nodes 21, the radio network node 21 serving as the boundary node is altered according to the state of the CN 10 or the RAN 20, in the present invention.

In order to implement this, at least one radio network node 21 in the RAN 20 has a duplicated RSVP processing section 22. The RSVP processing section 22 includes, for example, a CN side RSVP processing section 604 and a RAN side RSVP processing section 605.

A radio network node 21 having the duplicated RSVP processing section 22 (hereafter referred to as "radio network node 21A") assumes the case where it operates as a radio network node having a single RSVP processing section (single RSVP state) or the case where it operates as a radio network node having two RSVP processing sections conducting independent operations (multi-RSVP state), according to the state of the CN 10 and/or the RAN 20.

In the single RSVP state, the RSVP processing section 22 behaves as a single RSVP processing section with respect to RSVP messages. Therefore, the behavior of the radio network node 21A becomes the same as that of a node having a single RSVP processing section (for example, such as a node in the CN 10).

In the multi-RSVP state, one (CN side RSVP processing section 604) of the duplicated RSVP processing sections 22 terminates a RSVP message sent from the node 30, whereas the other (RAN side RSVP processing section 605) terminates a RSVP message sent from the mobile terminal 40. Furthermore, in the multi-RSVP state, the CN side RSVP processing section 604 periodically transmits are fresh message to the node 30 (CN side), and the RAN side RSVP processing section 605 periodically transmits a refresh message to the mobile terminal 40 (RAN side) The transmission period of the refresh message to the RAN side is shorter than the transmission period of the refresh message to the CN side.

By thus assuming the multi-RSVP state, the radio network node 21A functions as the above described boundary node. Therefore, the boundary node is called "multi-RSVP node" as well.

Furthermore, two RSVP processing sections (CN side RSVP processing section 604 and the RAN side RSVP processing section 605) forming the RSVP processing section 22 share information concerning resource reservation processing using the RSVP and exchange necessary information. As a result, the RSVP processing section 22 behaves as if the radio network node 21 mounts a single RSVP processing section.

Among a plurality of radio network nodes 21A, radio network nodes assuming the multi-RSVP state (multi-RSVP nodes) can dynamically shift with a flow as the unit according to the state of the CN 10 or the RAN 20.

As described above, the mobile communication system according to the present invention sets the RSVP processing, especially the refresh message transmission interval of the CN side and the RAN side mutually independently with the radio network node 21A assuming the multi-RSVP state (multi-RSVP node) serving as a boundary line.

Figure 5:
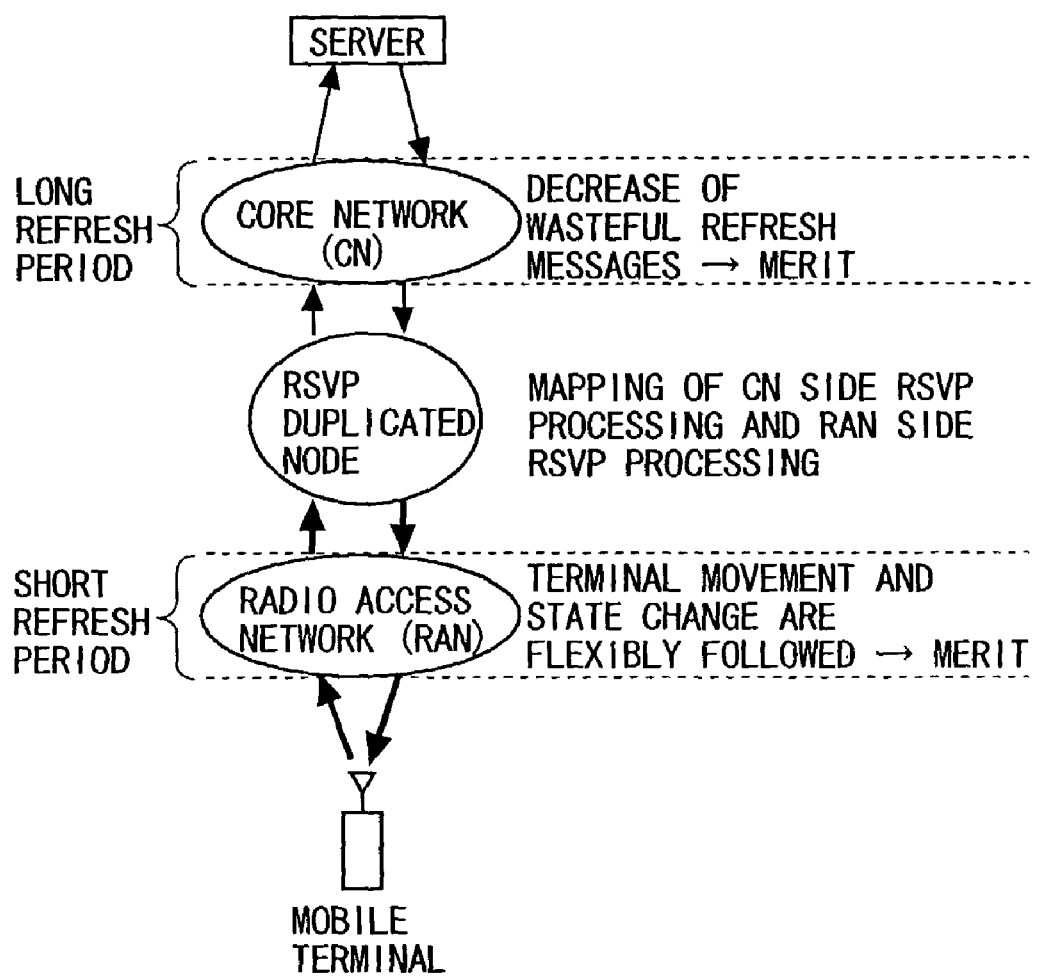
FIG. 5 is a diagram showing a RSVP network suitable for a mobile communication system.

As a result, the CN 10 which is small in state change and the RAN 20 which is very large in state change (especially route change) can exchange refresh messages with a suitable period depending on respective systems. Therefore, it is possible to manage and update the resource reservation state suitably while suppressing the waste of network resources caused by refresh messages (see FIG. 5).

In addition, the mobile communication system according to the present invention includes the following.

(1) A configuration and a method for conducting mapping control between two RSVP processing sections (the CN side RSVP processing section 604 and the RAN side RSVP processing section 605) when the radio network node 21 operates as the multi-RSVP node; and (2) A configuration and a method for causing transition of the multi-RSVP node every flow according to the state of the system (CN 10 and/or RAN 20).

[State Transition of Radio Network Node]

Figure 6:
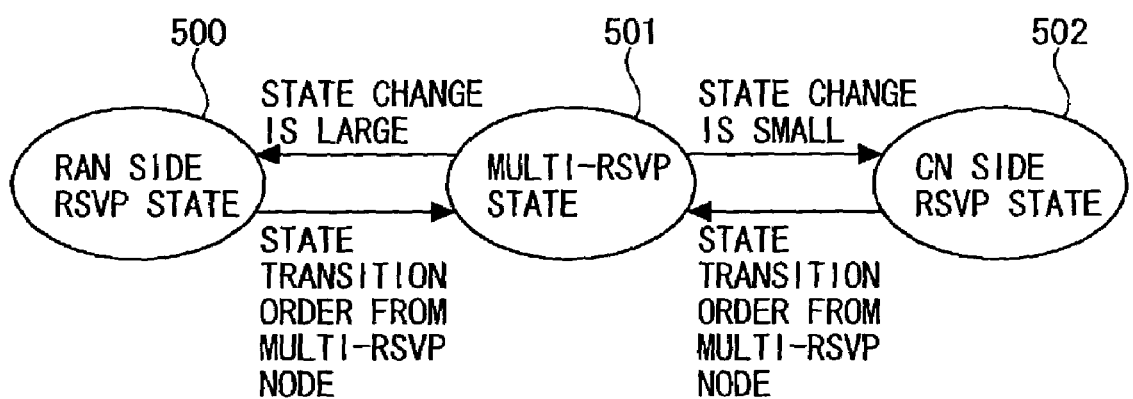
FIG. 6 is a diagram showing state transitions of a radio network node.

The concept of the transition of the radio network node 21A between the single RSVP state and the multi-RSVP state every flow will now be described. FIG. 6 is a diagram showing the state transition of the radio network node 21A.

The radio network node 21A conducts transition among a RAN side RSVP state 500, a multi-RSVP state 501, and a CN side RSVP state 502, according to the state of the CN 10 and/or the RAN 20. The states 500 to 502 shown in FIG. 6 have the following functions.

[Multi-RSVP State 501]

In the case where the radio network node 21A becomes a multi-RSVP node with respect to the flow resource reservation processing, the radio network node 21A assumes the multi-RSVP state 501. In the multi-RSVP state 501, the radio network node 21A terminates RSVPs (sessions) of the mobile terminal 40 side (RAN side) and the node 30 side (CN side) independently with respect to a flow that becomes the subject of the resource reservation processing based on the RSVP.

In other words, with respect to the flow between the node 30 and the mobile terminal 40, the multi-RSVP node establishes a RSVP session between the node 30 and the multi-RSVP node and a RSVP session between the multi-RSVP node and the mobile terminal 40, and conducts resource reservation processing and refresh operation independently for each session.

However, the RAN side RSVP processing section 605 and the CN side RSVP processing section 604, which form the RSVP processing section 22 in the radio network node 21A, share information management means concerning RSVP.

In other words, the RAN side RSVP processing section 605 and the CN side RSVP processing section 604 conduct management by using the same session identifiers (session IDs) as those of the CN side session and the RAN side session for one flow, mutually exchange reservation states (soft states; PATH state and RESV state) in respective sessions, and map reservation states in one of the sessions to reservation states in the other of the sessions.

As a result, the RAN side RSVP processing section 605 and the CN side RSVP processing section 604 operate as if the radio network node 21A has one RSVP processing section. In other words, the RSVP processing section 22 conducts processing on the flow as if resource reservation processing is conducted by one RSVP session on appearance (from the viewpoint of the node 30 or the mobile terminal 40).

Only the radio network node 21A assuming the multi-RSVP state 501, i.e., the multi-RSVP node has the decisive power to determine whether the state transition of the radio network node 21A should be conducted.

Therefore, the multi-RSVP node always monitors a change of the reservation state for the flow of the subject of the resource reservation processing. If predetermined conditions are satisfied, the multi-RSVP node can issue a suitable state transition order to a neighboring radio network node 21A.

Furthermore, the multi-RSVP node conducts the following processing on the RESV message and the PATH message.

(1) Receiving a RESV message from the RAN side and terminating it.

(2) Generating a RESV message and transmitting it to the CN side.

(3) Receiving a PATH message from the CN side and terminating it.

(4) Generating a PATH message and transmitting it to the RAN side.

However, the processing of (1) to (4) is processing conducted on the flow for transmitting data from the node 30 to the mobile terminal 40. In this case, the multi-RSVP node receives only the RESV message from the mobile terminal 40 (RAN side) and receives only the PATH message from the node 30 (CN side). In the case where the data transmission direction of the flow of the resource reservation processing is opposite to that of the above described flow, the "RAN side" and the "CN side" in the processing of (1) to (4) are interchanged.

[RAN Side RSVP State 500]

In the case where the radio network node 21A is located on the downstream side (RAN side) in the flow of the subject of the resource reservation processing as compared with the radio network node 21A (multi-RSVP node) of the multi-RSVP state 501, the radio network node 21A assumes the RAN side RSVP state 500 serving as one of the single RSVP states. In the RAN side RSVP state 500, the radio network node 21A operates as a node having a single RSVP processing section. In other words, the radio network node 21A transfers RSVP messages respectively received from the upstream side and the downstream side of the flow to the opposite sides, respectively.

The refresh period (the refresh message transmission interval) of the resource reservation state (soft state; called "RSVP state" as well) of the RAN side is shorter than that of the CN side, and the reservation state refreshing is conducted frequently.

The radio network node 21A of the RAN side RSVP state 500 conducts the following processing on the RESV message and the PATH message. However, it is supposed that data is transmitted from the node 30 to the mobile terminal 40 (flow of the node 30→the mobile terminal 40).

(1) Receiving a RESV message from the RAN side and transferring it to the CN side (2) Receiving a PATH message from the CN side and transferring it to the RAN side

[CN Side RSVP State 502]

In the case where the radio network node 21A is located on the upstream side (CN side) on the flow of the subject of the resource reservation processing as compared with the radio network node 21A of the multi-RSVP state 501 (the multi-RSVP node), the radio network node 21A assumes the CN side RSVP state 502 serving as one of the single RSVP states. In the CN side RSVP state 502, the radio network node 21A operates as a node having a single RSVP processing section. In other words, the radio network node 21A transfers RSVP messages respectively received from the upstream side and the downstream side to the opposite sides, respectively.

The refresh period (the refresh message transmission interval) of the resource reservation state (soft state or RSVP state) of the CN side is longer than that of the RAN side, and the reservation state is not refreshed frequently.

The radio network node 21A of the CN side RSVP state 502 conducts the following processing on the RESV message and the PATH message. However, it is supposed that data is transmitted from the node 30 to the mobile terminal 40 (flow of the node 30→the mobile terminal 40).

(1) Receiving a RESV message from the RAN side and transferring it to the CN side (2) Receiving a PATH message from the CN side and transferring it to the mobile terminal side The multi-RSVP node operates as hereafter described. The multi-RSVP node always monitors a change of the reservation state for the flow of the subject of the resource reservation processing. If a lot of changes of the reservation state do not occur on the RAN side, then refresh messages transmitted from the RAN side (mobile terminal 40) do not frequently change the reservation state of the RAN side managed by the multi-RSVP node.

If there is not a change in reservation state that is indicated by a refresh message received from the RAN side by the multi-RSVP node (i.e., if the reservation state contained in the refresh message is the same as the reservation state managed currently by multi-RSVP node), then the multi-RSVP node terminates the refresh message supplied from the RAN side here, and does not transfer the refresh message to the CN side.

Therefore, it is possible to prevent a large amount of refresh messages caused by the mobility of the mobile terminal 40 on the RAN side from flowing onto the CN side and exerting pressure upon the network resources of the CN side.

On the other hand, if there is a change in the reservation state that is indicated in the refresh message received (terminated) from the RAN side (i.e., if the reservation state contained in the refresh message is different from the reservation state managed currently by multi-RSVP node), then the multi-RSVP node generates a refresh message having the same contents as those of the received refresh message, and transmits the refresh message to the CN side. Because it is necessary to reflect the change of the reservation state of the RAN side on the flow of the processing subject onto the CN side.

In the case where the multi-RSVP node frequently receives refresh messages that indicate a change of the reservation state from the RAN side, therefore, the multi-RSVP node must generate a refresh message that indicates a change of the reservation state and transmit it to the CN side whenever the multi-RSVP node receives a refresh message. In such a case, the multi-RSVP node hardly fulfils function of terminating unnecessary refresh messages on the CN side.

If the number of received refresh messages that indicate a change of the reservation state from the RAN side in a predetermined time exceeds a predetermined upper limit value, therefore, then the multi-RSVP node gives a state transition order message to another neighboring radio network node 21A (hereafter referred to as "upstream node") located in the upstream (on the CN side) of the flow, causes a transition of the state of the upstream node to the RSVP state 501, and causes a transition of its own state to the RAN side RSVP state 500.

Thereafter, the radio network node 21A that has assumed the RAN side RSVP state 500 needs only simply transfer a refresh message supplied from the RAN side to the upstream node (it is not necessary to terminate and generate a refresh message.

If a refresh message received from the RAN side does not indicate a change of the reservation state, then the multi-RSVP node terminates the refresh message (stops the transfer). It is meaningless for the multi-RSVP node to receive such a refresh message from the RAN side. It results only in waste of network resources in the multi-RSVP node and in the vicinity of its downstream (such as radio network nodes that transfer refresh messages to the multi-RSVP node).

If the reservation state of the RAN side managed by the multi-RSVP node is hardly changed by a refresh message supplied from the RAN side, i.e., the number of received refresh messages that indicate a change of the reservation from the RAN side within a predetermined time is less than a predetermined lower limit value, then the multi-RSVP node gives a state transition order message to another neighboring radio network node 21A (hereafter referred to as "downstream node") located in the downstream (on the RAN side) of the flow, causes a transition of the state of the downstream node to the multi-RSVP state 501, and causes a transition of the downstream node to the multi-RSVP state 501, and causes a transition of its own state to the CN side RSVP state 502.

Thus the mobile communication system includes boundary node alteration means for altering a boundary node according to the state change of the mobile communication network. As a result, transfer processing of useless refresh messages is suppressed, and it becomes possible to utilize network resources that have been used in the processing for other uses.

As described above, all decisions as to whether a state transition of a node should be conducted are effected by the multi-RSVP node. By receiving a state transition order from the multi-RSVP node, therefore, the radio network node 21A of the RAN side RSVP state 500 or the CN side RSVP state 502 causes a transition of its state to the multi-RSVP state 501 and functions as a new multi-RSVP node.

[Radio Network Node 21A]

Figure 7:
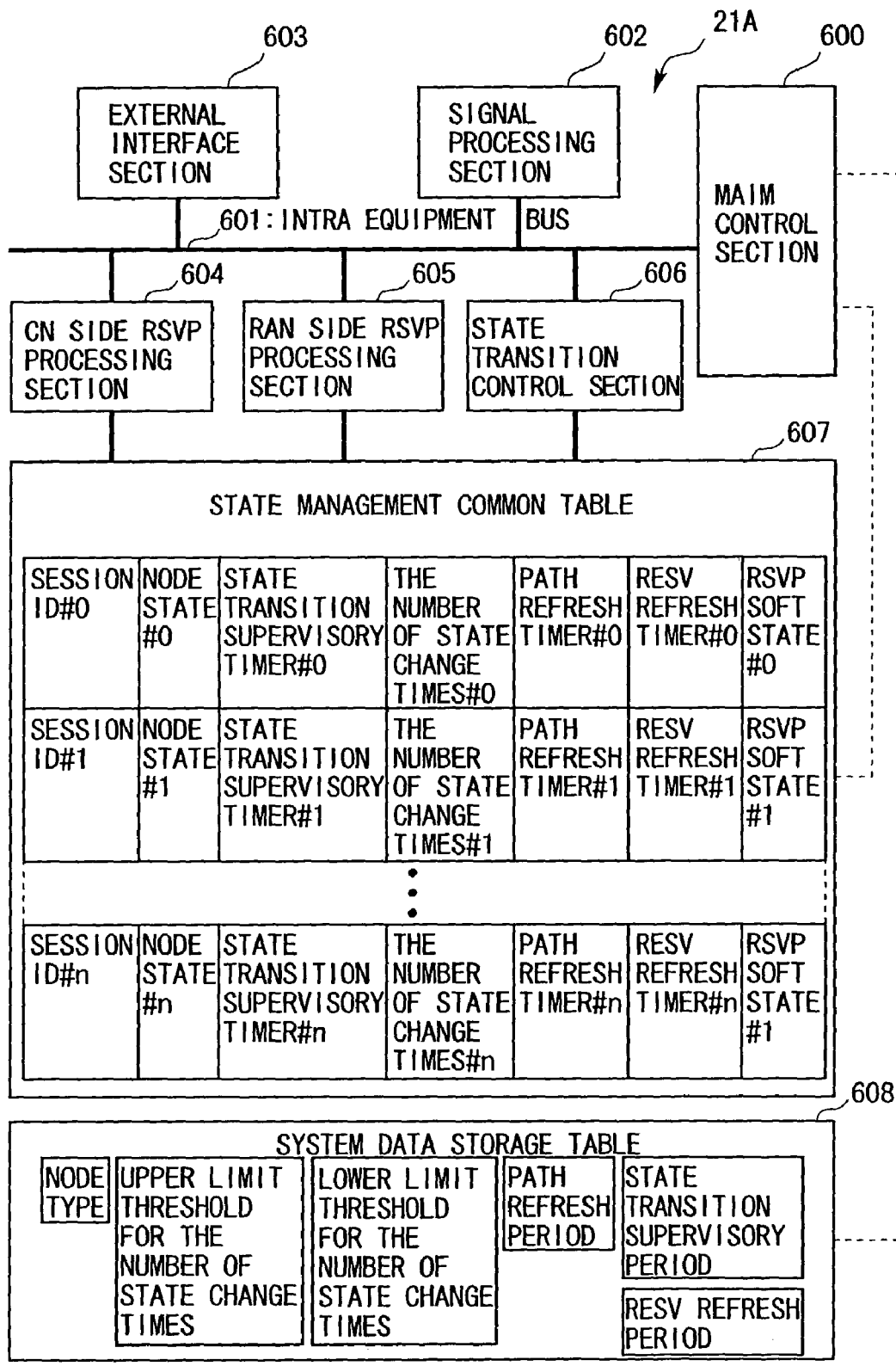
FIG. 7 is a diagram showing an embodiment of a radio network node.

An embodiment of the radio network node 21A for making possible the operation as described above will now be described. FIG. 7 is a diagram showing an embodiment of the radio network node 21A.

The radio network node 21A includes a CN side RSVP processing section 604 for terminating a CN side RSVP session, a RAN side RSVP processing section 605 for terminating a RAN side RSVP session, a state transition control section 606 for conducting processing concerning the state transition as described with reference to FIG. 6, an external interface section 603 serving as an interface with another radio network node 21 or 21A, a signal processing section 602 for conducting conventional radio signal processing and resource reservation processing based upon the RSVP message, and a main control section 600. These components are connected to each other by an intra equipment bus 601. The CN side RSVP processing section 604 and the RAN side RSVP processing section 605 form the duplicated RSVP processing section 22.

Furthermore, the radio network node 21A includes a state management common table 607 serving as a state storage section. The state management common table 607 stores the RSVP soft state and information relating to the RSVP soft state, by taking a flow as the unit. The state management common table 607 is information storage means commonly referred to by the CN side RSVP processing section 604, the RAN side RSVP processing section 605 and the state transition control section 606.

Furthermore, the radio network node 21A includes a system data storage table 608. The system data storage table 608 stores parameters peculiar to the radio network node 21A. The main control section 600 acquires parameters required when restarting the radio network node 21A, and sets the parameters in necessary regions.

<State Management Common Table>

The state management common table 607 is formed so as to store one or more entries (records) generated every flow. Each entry has a plurality of regions for setting a session ID for the flow, a node state, the number of state change times, a PATH refresh timer serving as a first timer, a RESV refresh timer serving as a second timer, and a RESV soft state. Each information will now be described.

With respect to a flow having the node 30 in the upstream and having the mobile terminal 40 in the downstream, the state management common table 607 shown in FIG. 7 stores information for the radio network node 21A to conduct a state transition on the basis of a refresh message (RESV message) transmitted from the mobile terminal 40.

[Session ID]

The session ID is an identifier provided for each flow. The session ID is used to identify a flow within the radio network node 21A (device). In the present embodiment, the same session ID is used for a RSVP session of the RAN side and a RSVP session of the CN side with respect to one flow.

[Node State]

The node state indicates a state of the radio network node 21A for a flow specified by the session ID. As the node state, "multi-RSVP state", "RAN side RSVP state" or "CN side RSVP state" is stored.

[State Transition Supervisory Timer]

The state transition supervisory timer is a timer for periodically supervising the number of times of the RSVP soft state (the number of state change times) for the RAN side session with respect to a flow. This timer periodically measures a predetermined time. Whenever a predetermined time is measured, the timer refers to the number of state change times conducted in the predetermined time.

[Number of State Change Times]

The number of state change times is the number of times the RSVP state has changed for the RAN side session. On the basis of a value stored as the number of state change times, control is conducted as to whether the radio network node 21A should effect a state transition. The number of state change times is reset and cleared (to "0") whenever the state transition supervisory timer times out.

[PATH Refresh Timer]

The PATH refresh timer is a timer for measuring the time in order to periodically transmit a PATH message to the RAN side (mobile terminal 40) as a refresh message. The PATH refresh timer is used only in the case where the node state corresponding to the session is the multi-RSVP state. A PATH refresh period is used as time (timer value) measured by the PATH refresh timer. Expiration (time out) of the RESV refresh timer is detected by the RAN side RSVP processing section 605. At this time, a PATH message is transmitted to the RAN side.

[RESV Refresh Timer]

The RESV refresh timer is a timer for measuring the time in order to periodically transmit a RESV message to the CN side (node 30) as a refresh message. In the same way as the PATH refresh timer, the RESV refresh timer is used only in the case where the node state corresponding to the session is the multi-RSVP state. A RESV refresh period is used as time (timer value) measured by the RESV refresh timer. Expiration (time out) of the RESV refresh timer is detected by the CN side RSVP processing section 604. At this time, a RESV message is transmitted to the CN side.

[RSVP Soft State]

The RSVP soft state is information concerning the resource reservation processing stored in a RESV message or a PATH message. At least, information indicating the resource reservation state is stored as the RSVP soft state.

<System Data Storage Table>

The system data storage table 608 has a region for storing a node type, an upper limit threshold for the number of state change times, a lower limit threshold for the number of state change times, a PATH refresh period, and a RESV refresh period. Each information will now be described.

[Node Kind]

The node type is information indicating whether a radio network node 21A is a gateway node. The gateway node is defined as a radio network node 21A that assumes the multi-RSVP state when a session for a flow is newly added.

[Upper Limit Threshold for the Number of State Change Times]

The upper limit threshold for the number of state change times is a threshold that functions as a state transition trigger of a radio network node 21A for a session assuming the multi-RSVP state as its node state. If the number of state change times has exceeded the upper limit threshold for the number of state change times, then the radio network node 21A transmits a state transition order message for ordering transition of the session to the multi-RSVP state, to another neighboring radio network node 21A located upstream itself, and causes a transition of its own state to the RAN side RSVP state.

[Lower Limit Threshold for the Number of State Change Times]

The lower limit threshold for the number of state change times is a threshold that functions as a state transition trigger of a radio network node 21A for a session assuming the multi-RSVP state as its node state. If the number of state change times has become less than the lower limit threshold for the number of state change times, then the radio network node 21A transmits a state transition order message for ordering transition of the session to the multi-RSVP state, to another neighboring radio network node 21A located downstream itself, and causes a transition of its own state to the CN side RSVP state.

[PATH Refresh Period]

The PATH refresh period is information indicating a timer value used as a PATH refresh timer value. Typically, a value smaller than a RESV refresh period is set as the PATH refresh period. It aims at conducting refreshment more frequently on the RAN side than on the CN side.

[RESV Refresh Period]

The RESV refresh period is information indicating a timer value used as a RESV refresh timer value. Typically, a value greater than the PATH refresh period is set as the RESV refresh period. It aims at lengthening the transmission interval of the refresh message (RESV message) transmitted to the CN side and thereby suppressing the waste of resources of the CN side.

[State Transition Supervisory Period]

The state transition supervisory period is information indicating a timer value used as a state transition supervisory timer value.

<State Transition Control Section>

The state transition control section 606 will now be described. The state transition control section 606 discriminates a RSVP soft state every session by referring to the state management common table 607, and mainly conducts the following processing according to the RSVP soft state.

The state transition control section 606, cleared the number of state change times to 0 every fixed time (state transition supervisory timer value) measured by the state transition supervisory timer, for all sessions assuming the multi-RSVP state as the node state in the state management common table 607. This aims at measuring the number of state change times that occur within a certain unit time (state transition supervisory timer value). The 0 clear timing may be common or may be different every session.

Upon receiving a RSVP state change notice from the RAN side RSVP processing section 605 or the CN side RSVP processing section 604 with regard to a session of the multi-RSVP state, the state transition control section 606 adds 1 to the number of state change times. In succession, the state transition control section 606 compares a value obtained by the addition with the upper limit threshold for the number of state change times and the lower limit threshold for the number of state change times. If at this time the value obtained by the addition has exceeded the upper limit threshold or become less than the lower limit threshold, the state transition control section 606 causes a transition of the node state for that session.

In addition, upon receiving a state transition order message for causing a transition of the node state with regard to a certain session from a neighboring multi-RSVP node, the state transition control section 606 sets the node state for the session to the multi-RSVP state.

Also when newly adding a session, the state transition control section 606 sets the node state.

<Processing on RSVP Message>

Processing on a RSVP message in a radio network node 21A will now be described. With reference to FIG. 7, the radio network node 21A receives all RSVP messages transmitted from the RAN side (mobile terminal side) and the CN side in the external interface section 603. As described above, the RSVP message is a PATH message, a RESV message, a PATH TEAR message, or a RESV TEAR message.

The CN side RSVP processing section 604 receives from the external interface section 603 all RSVP messages from the CN side, and conducts processing on the received RSVP messages. On the other hand, the RAN side RSVP processing section 605 receives all RSVP messages from the RAN side, and conducts processing on the received RSVP messages.

<<Example of Operation on RESV Message>>

Figure 8A:
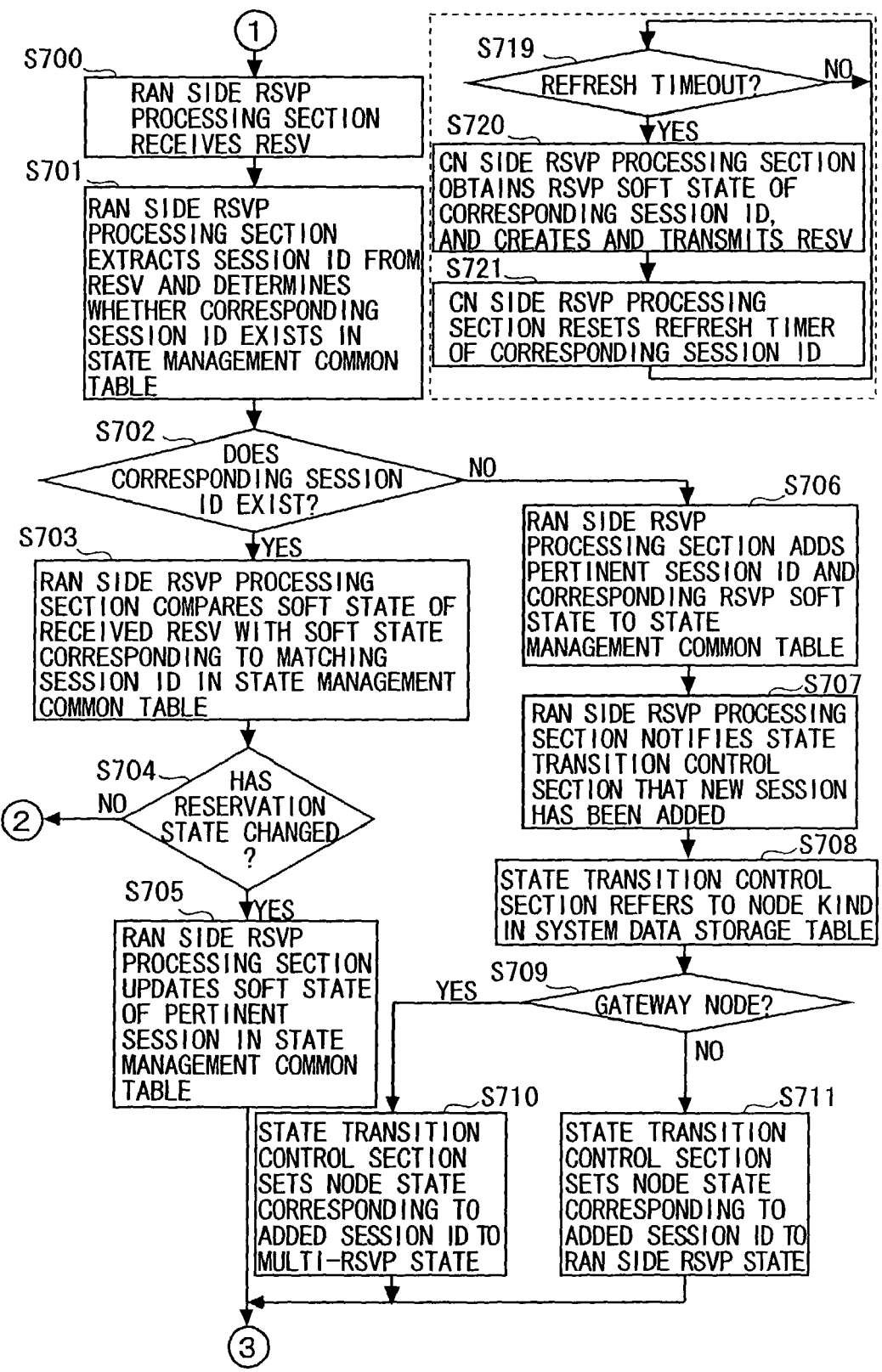
FIGS. 8A and 8B are diagrams respectively showing an example of a processing flow of a RESV message conducted by a radio network node.
Figure 8B:
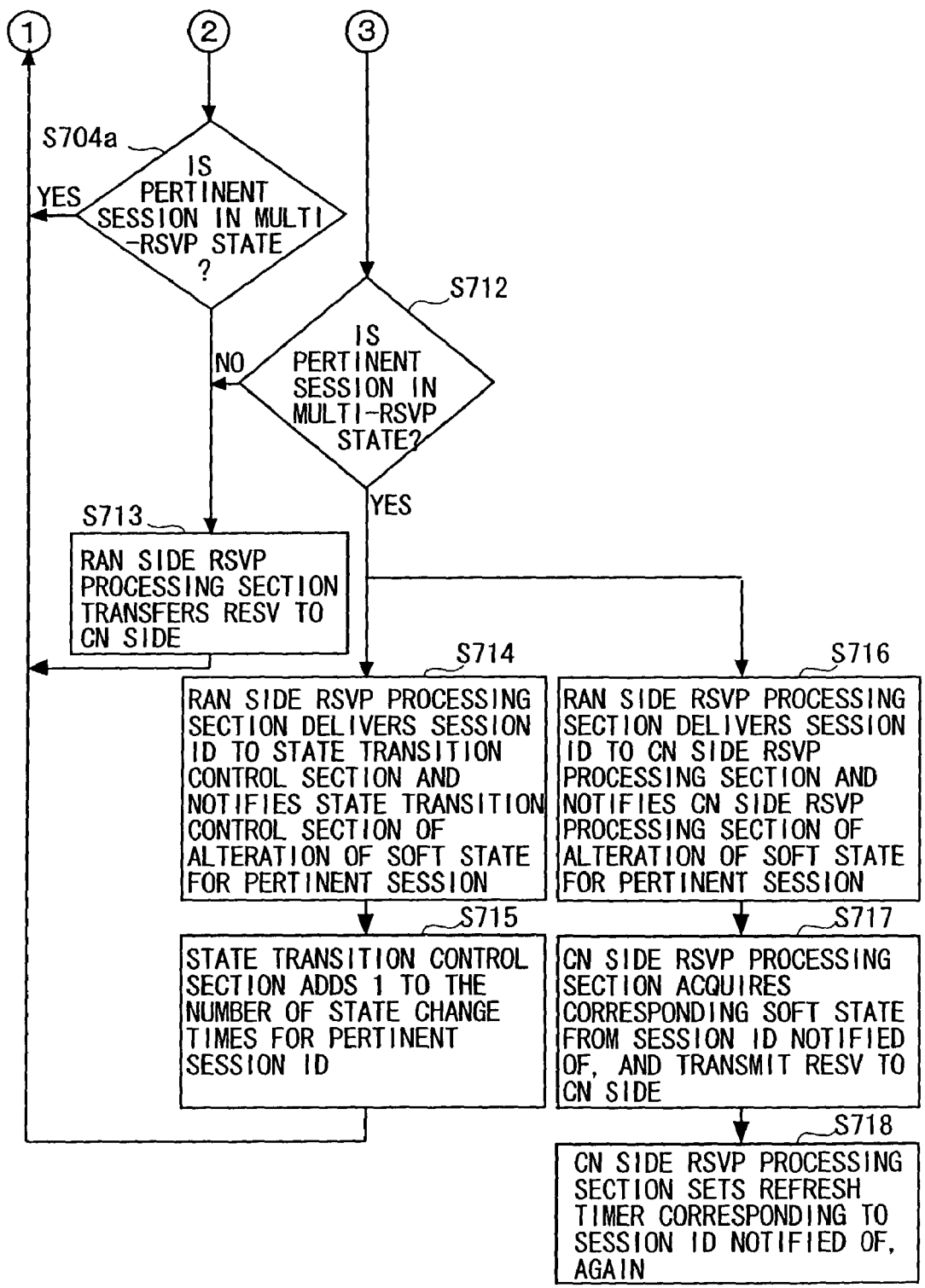

Hereafter, operation of a radio network node 21A conducted on a RESV message, which is a refresh message, will be described. FIGS. 8A and 8B are diagrams showing a flow of operation conducted when processing of a RESV message is effected in the radio network node 21A. In the present embodiment, it is supposed that the RESV message is transmitted only from the mobile terminal side (RAN side).

Upon receiving a RESV message at step S700, the RAN side RSVP processing section 605 extracts a session ID from the RESV message, and effects a check to determine whether the session ID is stored in the state management common table 607 (steps S701 and S702).

If the same session ID as the extracted session ID exists in the state management common table 607 at the step S702 (S702; YES), then the RAN side RSVP processing section 605 compares a RSVP soft state stored in the RESV message with a RSVP soft state in the state management common table 607 corresponding to the session ID (step S703), and determines whether a resource reservation state indicated as the RSVP soft state has changed (step S704).

If at this time the reservation state has not changed (S704; NO), then the RAN side RSVP processing section 605 refers to the node state corresponding to the session ID and determines whether the node state is the multi-RSVP state (step S704a). If the node state is the multi-RSVP state (S704a; YES), then the RAN side RSVP processing section 605 finishes processing on the RESV message.

In other words, the RAN side RSVP processing section 605 terminates the RESV message, and stops the transfer. As a result, a refresh message that does not indicate a reservation state change is prevented from being transferred to the CN side.

On the other hand, if at the step S704a the node state is not the multi-RSVP state (S704a; NO), then the RAN side RSVP processing section 605 transfers the RESV message to the CN side (step S713) and finishes the processing on the RESV message.

On the other hand, if at the step S704 the reservation state is judged to have changed (S704; YES), then the RAN side RSVP processing section 605 updates the RSVP soft state (resource reservation state) corresponding to the session ID in the state management common table 607 (step S705).

In succession, the RAN side RSVP processing section 605 refers to the node state corresponding to the session ID, and determines whether the node state is the multi-RSVP state (step S712). If at this time the node state is not the multi-RSVP state (S712; NO), then the RAN side RSVP processing section 605 transfers the RESV message to the CN side (step S713), and finishes the processing on the RESV message. The processing conducted at the step S713 is processing conducted as the single RSVP state (the RAN side RSVP state 500 or the CN side RSVP state 502).

On, the other hand, if at the step S712 the node state corresponding to the session ID is judged to be the multi-RSVP state (S712; YES), then the RAN side RSVP processing section 605 conducts the following two kinds of processing in parallel.

First, the RAN side RSVP processing section 605 delivers the session ID to the state transition control section 606, and notifies the state transition control section 606 that the RSVP soft state for the session ID has changed (step S714). Upon receiving this notice, the state transition control section 606 adds 1 to the number of state change times corresponding to the session ID notified of in the state management common table 607 (step S715).

Secondly, the RAN side RSVP processing section 605 delivers the session ID to the CN side RSVP processing section 604, and notifies CN side RSVP processing section 604 that the RSVP soft state for the session ID has changed (step S716).

Upon receiving the notice from the RAN side RSVP processing section 605, the CN side RSVP processing section 604 acquires an RSVP soft state (resource reservation state) in the state management common table 607 corresponding to the session ID notified of, generates a RESV message containing the RSVP soft state, and transmits the RESV message to the CN side (step S717) Then, the CN side RSVP processing section 604 resets a RESV refresh timer corresponding to the session ID notified of (step S718).

When the processing of the steps S715 and S716 is finished, the RAN side RSVP processing section 605 finishes the processing on the RESV message, and becomes ready to accept the next RESV message.

If at the step S702 the session ID extracted from the RESV message does not coincide with any of session IDs managed in the state management common table 607 (S702; NO), then the RAN side RSVP processing section 605 adds the extracted session ID and RSVP information (RSVP soft state; resource reservation state) stored in the RESV message to the state management common table 607 (step S706). Then, the RAN side RSVP processing section 605 notifies the state transition control section 606 that a new session has been added (step S707).

Upon receiving the notice of new session addition from the RAN side RSVP processing section 605, the state transition control section 606 refers to a node type stored in the system data storage table 608 (step S708), and effects a check to determine whether the radio network node 21A is a gateway node (step S709).

If at this time the node type is a gateway node (step S709; YES), then the state transition control section 606 sets the node state for the added session to the multi-RSVP state (step S710). As a result, the radio network node 21A behaves as a multi-RSVP node for the added session.

On the other hand, if the node type is not a gateway node (step S709; NO), then the state transition control section 606 sets the node state for the added session to the RAN side RSVP state (step S711). Then, the above described processing of the step S712 and subsequent steps is conducted.

With regard to a session assuming the multi-RSVP state as the node state, processing of periodically generating a RESV message and transmitting the RESV message to the CN side is conducted by the CN side RSVP processing section 604 as described below independently of the series of processing of the steps S700 to S718.

If at step S719 a RESV refresh timer (first timer) corresponding to a certain session of the multi-RSVP state times out (S719; YES), then the CN side RSVP processing section 604 serving as a first processing section acquires a RSVP soft state (resource reservation state) corresponding to the session from the state management common table 607, generates a RESV message containing the RSVP soft state, and transmits the RESV message to the CN side (step S720).

Then, at step S721, the CN side RSVP processing section 604 resets the RESV refresh timer that has timed out. As a result, a RESV message for refreshing the resource reservation state is transmitted periodically to the CN side.

<<Example of Operation on PATH Message>>

Figure 9A:
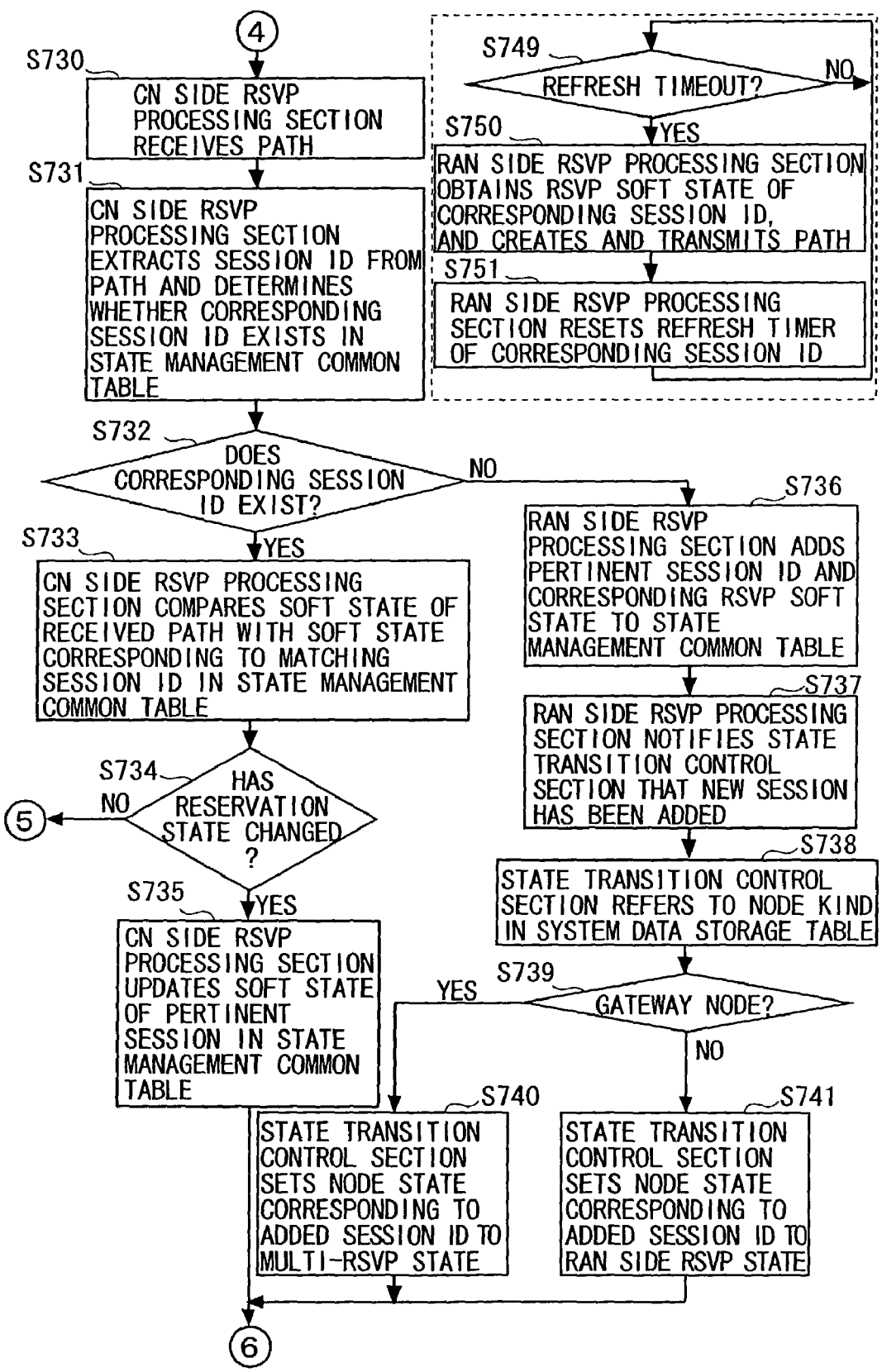
FIGS. 9A and 9B are diagrams respectively showing an example of a processing flow of a PATH message conducted by a radio network node.
Figure 9B:
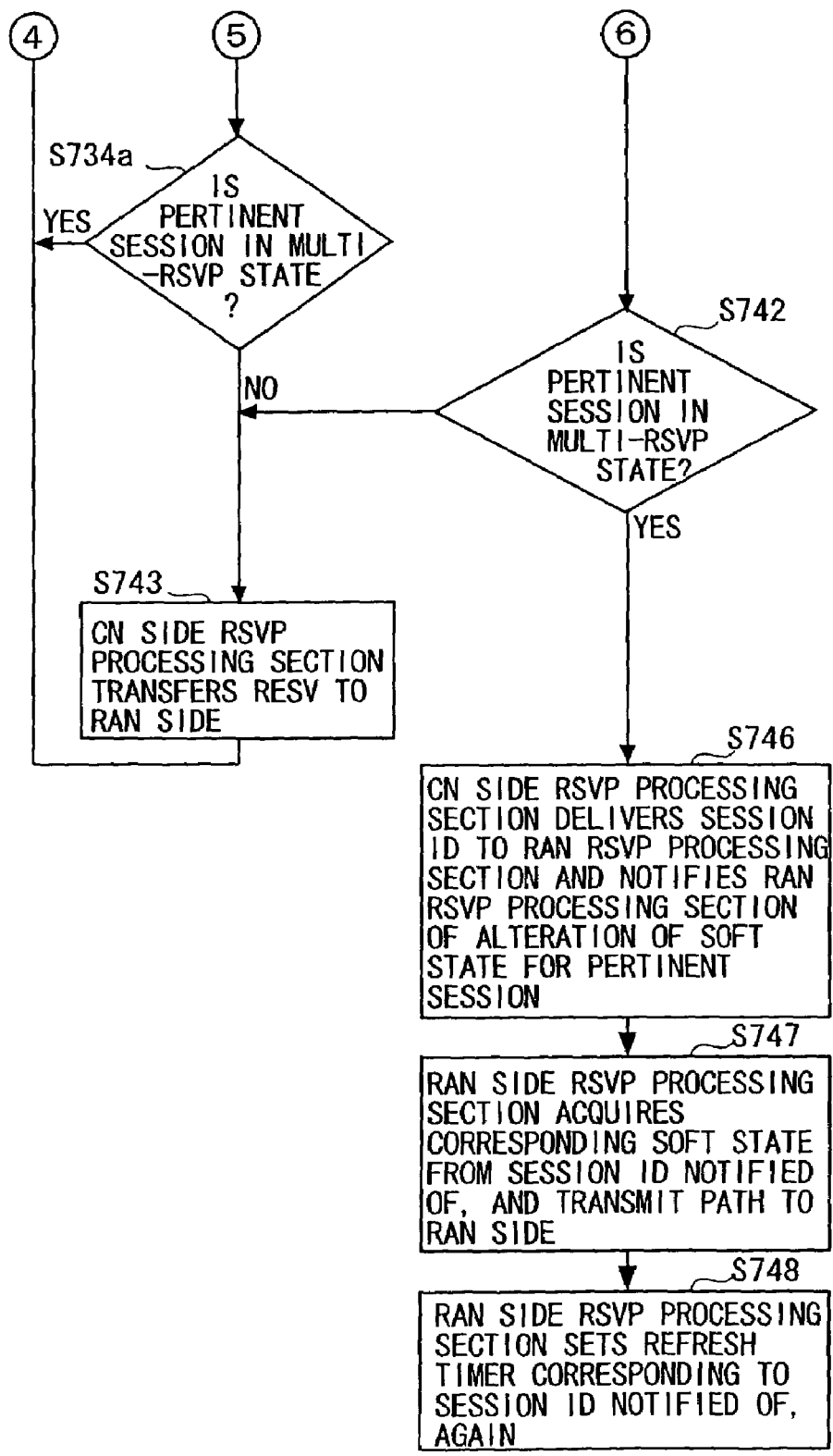

Processing on a PATH message conducted in a radio network node 21A is conducted in the same way as the processing on a RESV message as hereafter described. FIGS. 9A and 9B are diagrams showing a flow of operation conducted when processing of a PATH message is effected in the radio network node 21A. It is supposed that the PATH message is transmitted only from the node 30 side (CN side).

Upon receiving a PATH message at step S730, the CN side RSVP processing section 604 extracts a session ID from the PATH message, and effects a check to determine whether the session ID is stored in the state management common table 607 (steps S731 and S732).

If the same session ID as the extracted session ID exists in the state management common table 607 at the step S732 (S732; YES), then the CN side RSVP processing section 604 compares a RSVP soft state stored in the PATH message with a RSVP soft state in the state management common table 607 corresponding to the session ID (step S733).

In succession, the CN side RSVP processing section 604 determines on the basis of a result of the comparison whether the RSVP soft state, i.e., the reservation state has changed (step S734). If at this time the reservation state has not changed (S734; NO), then the CN side RSVP processing section 604 determines whether the node state corresponding to the session ID is the multi-RSVP state (step S734a). If at this time the node state is the multi-RSVP state (S734a; YES), then the CN side RSVP processing section 604 finishes processing on the PATH message in order to prevent wasteful PATH messages from being transferred to the RAN side.

On the other hand, if at the step S734a the node state is not the multi-RSVP state (S734a; NO), then the CN side RSVP processing section 604 transfers the PATH message to the RAN side (step S743) and finishes the processing on the PATH message. The processing conducted at the step S743 is processing conducted as the single RSVP state (the RAN side RSVP state 500 or the CN side RSVP state 502).

On the other hand, if at the step S734 the reservation state is judged to have changed (S734; YES), then the CN side RSVP processing section 604 updates a RSVP soft state in the state management common table 607 (step S735).

Then, the CN side RSVP processing section 604 refers to a node state corresponding to the session ID, and determines whether the node state is the multi-RSVP state (S742). If at this time the node state is not the multi-RSVP state (S742; NO), then the CN side RSVP processing section 604 transfers the PATH message to the RAN side (S743).

On the other hand, if at the step S742 the node state of the session is judged to be the multi-RSVP state (S742; YES), then at step S746 the CN side RSVP processing section 604 delivers the session ID to the RAN side RSVP processing section 605, and notifies the RAN side RSVP processing section 605 that the RSVP soft state of the session has changed. If the processing of S746 is finished, the CN side RSVP processing section 604 finishes the processing on the PATH message, and becomes ready to accept the next PATH message.

Upon receiving the notice from the CN side RSVP processing section 604, the RAN side RSVP processing section 605 acquires a RSVP soft state in the state management common table 607 corresponding to the session ID notified of, generates a PATH message containing the RSVP soft state, and transmits the PATH message to the RAN side (step S747). Then, at step S748, the CN side RSVP processing section 604 resets a PATH refresh timer corresponding to the session ID notified of.

If at the step 732 the session ID extracted from the PATH message does not coincide with any of session IDs stored in the state management common table 607 (S732; NO), then the CN side RSVP processing section 604 adds the extracted session ID and information contained in the PATH message (information corresponding to RSVP soft state) to the state management common table 607 (step S736) Then, the CN side RSVP processing section 604 notifies the state transition control section 606 that a new session has been added (step S737).

Upon receiving the notice of new session addition, the state transition control section 606 refers to a node type stored in the system data storage table 608 (step S738), and effects a check to determine whether the radio network node 21A is a gateway node (step S739).

If at this time the node type is a gateway node (step S739; YES), then the state transition control section 606 sets the node state for the added session to the multi-RSVP state (step S740).

On the other hand, if the node type is not a gateway node (step S739; NO), then the state transition control section 606 sets the node state for the added session to the RAN side RSVP state 500 (step S741). If the processing of the step S740 or S741 is finished, the processing proceeds to step S742.

With regard to a session assuming the multi-RSVP state as the node state, processing of periodically generating a PATH message and transmitting the PATH message to the RAN side is conducted as described below independently of the processing of the steps S730 to S743 and S746 to S748.

If at step S749 a PATH refresh timer (second timer) corresponding to a certain session of the multi-RSVP state times out (S749; YES), then the RAN side RSVP processing section 605 serving as a second processing section acquires a RSVP soft state corresponding to the session from the state management common table 607, generates a PATH message containing the RSVP soft state, and transmits the PATH message to the RAN side (step S750) Then, at step S751, the RAN side RSVP processing section 605 resets the PATH refresh timer that has timed out.

In the case where a new session is added to a data flow from the data transmission node (such as the server 30) to the data reception node (such as the mobile terminal 40), in the present embodiment each radio network node 21A receives a new PATH message and thereby the state of the node is set (S736 to S741). At this time, a radio network node 21A corresponding to a gateway from the CN 10 to the RAN 20 is determined to become a gateway node.

At the time when a new session has been added, therefore, the state of a plurality of radio network nodes 21A on the flow becomes either the multi-RSVP state 501 or the RAN-side RSVP state 500. Then, in the case where the number of state change times of the session is small (such as the case where the movement range of the mobile terminal 40 is small), the multi-RSVP state 501 moves to the downstream side (mobile terminal 40 side). At this time, a radio network node 21A of the CN side RSVP state 502 appears.

As shown in FIGS. 8A, 8B, 9A, and 9B, a decision as to whether a radio network node 21A conducts a state transition is effected on the basis of the number of times the reservation state is changed by refresh messages (RESV messages) from the RAN side. Therefore, the state management common table 607 does not have the number of state change time and a state transition supervisory timer concerning the PATH message, and processing corresponding to the steps S714 and S715 is not conducted. Because it is considered that the route change of the CN 10 does not occur frequently and the PATH message indicating a state change from the CN side is not transmitted frequently. However, it is also possible that the state management common table 607 further stores the number of state change times and a state transition supervisory timer concerning the PATH message and processing corresponding to the steps S714 and S715 is conducted on the PATH message from the CN side.

If the reservation state is changed by a received refresh message (a RESV message or a PATH message), the CN side RSVP processing section 604 and the RAN side RSVP processing section 605 conducts resource reservation processing according to its reservation state. In the case where the reservation state has been changed by a refresh message, a node having a single RSVP processing section instead of the RSVP processing section 22 also conducts resource reservation processing according to the reservation state.

According to operations shown in FIGS. 8A, 8B, 9A, and 9B, a RESV message transmitted from the multi-RSVP node is received by the node 30 via one or more nodes (relay nodes) on the CN side. On the other hand, a PATH message transmitted from the multi-RSVP node is received by the mobile terminal 40 via one or more nodes (relay nodes) on the RAN side.

<Example of Operation in State Operation Control>

A processing flow at the time when processing concerning the transition of the node state is conducted in the radio network node 21A will now be described.

Figure 10:
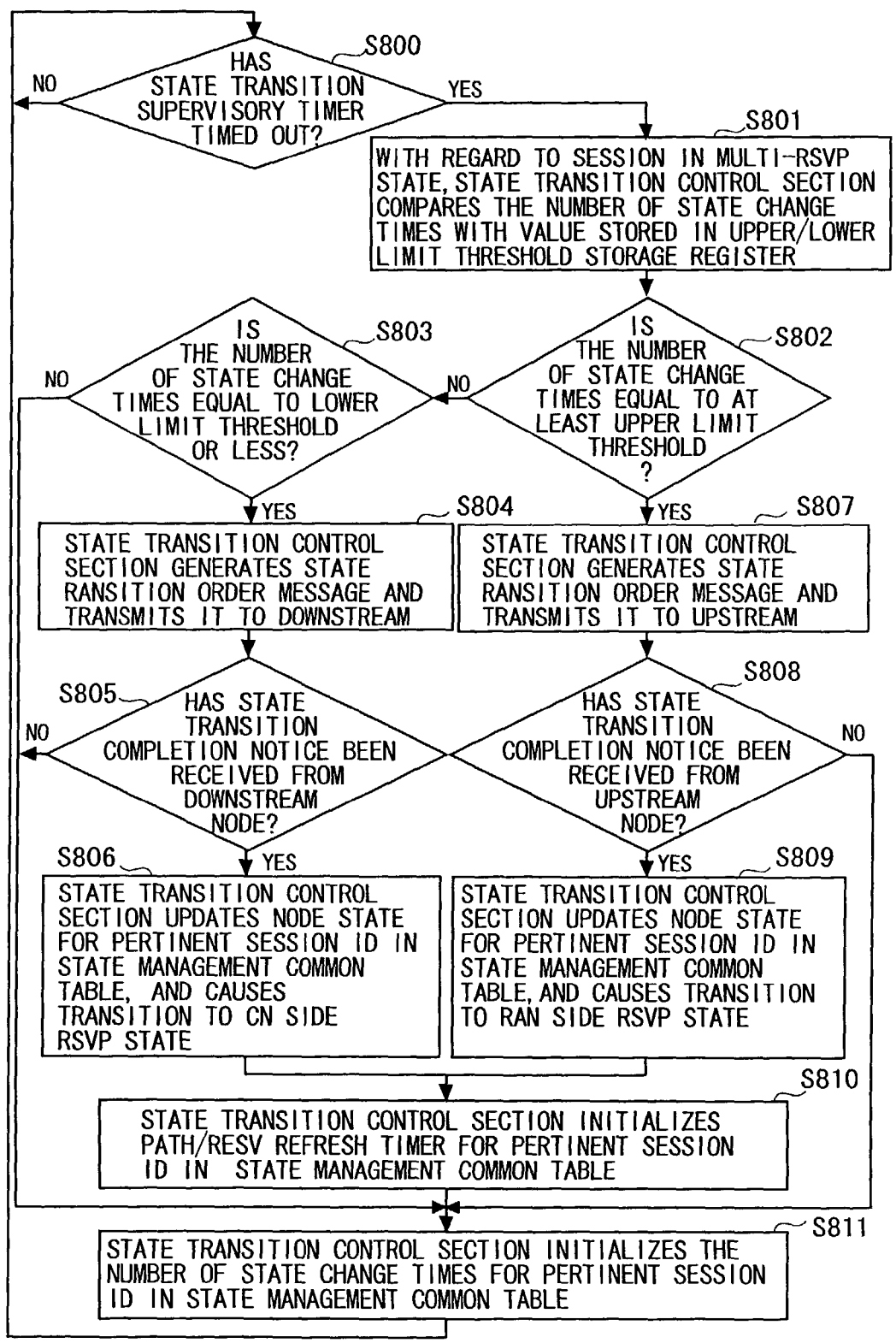
FIG. 10 is a diagram showing an example of a processing flow of state transition control in a radio network node.

The state transition control section 606 shown in FIG. 7 conducts processing shown in FIG. 10 with regard to a session having the multi-RSVP state as its node state, among sessions managed in the state management common table 607. FIG. 10 is a flow chart showing an example of state transition control conducted in the radio network node 21A.

In FIG. 10, the state transition control section 606 compares the number of state change times of a session that periodically assumes the multi-RSVP state with the upper limit threshold for the number of state change times and the lower limit threshold for the number of state change times (steps S800 to S803).

If the state transition supervisory timer of a session managed by the state management common table 607 has times out (S800), then the state transition control section 606 refers to the node state corresponding to the session ID, and determines whether the node state is the multi-RSVP state. If the node state is the multi-RSVP state, then the state transition control section 606 compares the number of state change times of the session with the upper limit threshold for the number of state change times and the lower limit threshold for the number of state change times (S801). And the state transition control section 606 determines whether the number of state change times is at least the upper limit threshold (S802). If the number of state change times is not at least the upper limit threshold (S802; NO), then the state transition control section 606 determines whether the number of state change times is equal to the lower limit threshold or less (S803). If the node state of the session for which the state transition supervisory timer has times out is not the multi-RSVP state, then the processing shown in FIG. 10 is finished.

If the number of state change times is not at least the upper limit threshold (S802; NO) and the number of state change times is not equal to the lower limit threshold or less (S803; NO), then the state transition control section 606 initializes the number of state change times corresponding to the pertinent session ID in the state management common table 607 at step S811. Then the processing returns to the step S800.

If the number of state change times is equal to the lower limit threshold or less (S803; YES), then the state transition control section 606 generates a state transition order message, and transmits the message to a downstream node corresponding to destination of the message (step S804) Then the state transition control section 606 waits for a state transition completion notice from the downstream node for a predetermined time (step S805).

On the other hand, if the number of state change times is at least the upper limit threshold (S802; YES), then the state transition control section 606 generates a state transition order message, and transmits the message to an upstream node corresponding to destination of the message (step S807). Then the state transition control section 606 waits for a state transition completion notice from the upstream node for a predetermined time (step S808).

If the state transition completion notice from the downstream node is not received within a predetermined time at the step S805 (S805; NO), or if the state transition completion notice from the upstream node is not received within a predetermined time at the step S805 (S808; NO), then the state transition control section 606 initializes the number of state change times for the pertinent session ID in the state management table 607 (step S811) and returns the processing to the step S800.

On the other hand, if the state transition completion notice is received from the downstream node within a predetermined time (S805; YES), then the state transition control section 606 updates the node state for the pertinent session in the state management common table 607 to the CN side RSVP state (step S806). As a result, the state of the radio network node 21A for the pertinent session effects a transition from the multi-RSVP state to the CN side RSVP state.

In the same way, if the state transition completion notice is received from the upstream node within a predetermined time (S808; YES), then the state transition control section 606 updates the node state for the pertinent session in the state management common table 607 to the RAN side RSVP state (step S809). As a result, the state of the radio network node 21A for the pertinent session effects a transition from the multi-RSVP state to the RAN side RSVP state.

Then, the state transition control section 606 initializes (resets) the PATH refresh timer and the RESV refresh timer for the pertinent session ID in the state management common table 607 (step S810). In succession, the state transition control section 606 initializes (resets) the number of state change times corresponding to the pertinent session ID in the state management common table 607 (step S811).

In the above described operation, the state transition control section 606 takes the state transition supervisory timer value as unit time and on the basis of the number of times the reservation state is changed (the number of state change times) in the unit time the state transition control section 606 effects a decision on the state transition of the radio network node 21A. Instead of this, the decision on the state transition of the radio network node 21A may also be conducted by using the accumulated number of state change times of the RAN side since the establishment of the communication (flow).

<Example of Operation Using Reception of State Transition Message>

Operation conducted when the radio network node 21A has received the state transition order message transmitted at the step S804 or S807 will now be described. The state transition order message is transmitted as one of the RSVP messages, received by the external interface section 603 of a radio network node 21A corresponding to destination address, and delivered to the CN side RSVP processing section 604 or the RAN side RSVP processing section 605.

Figure 11:
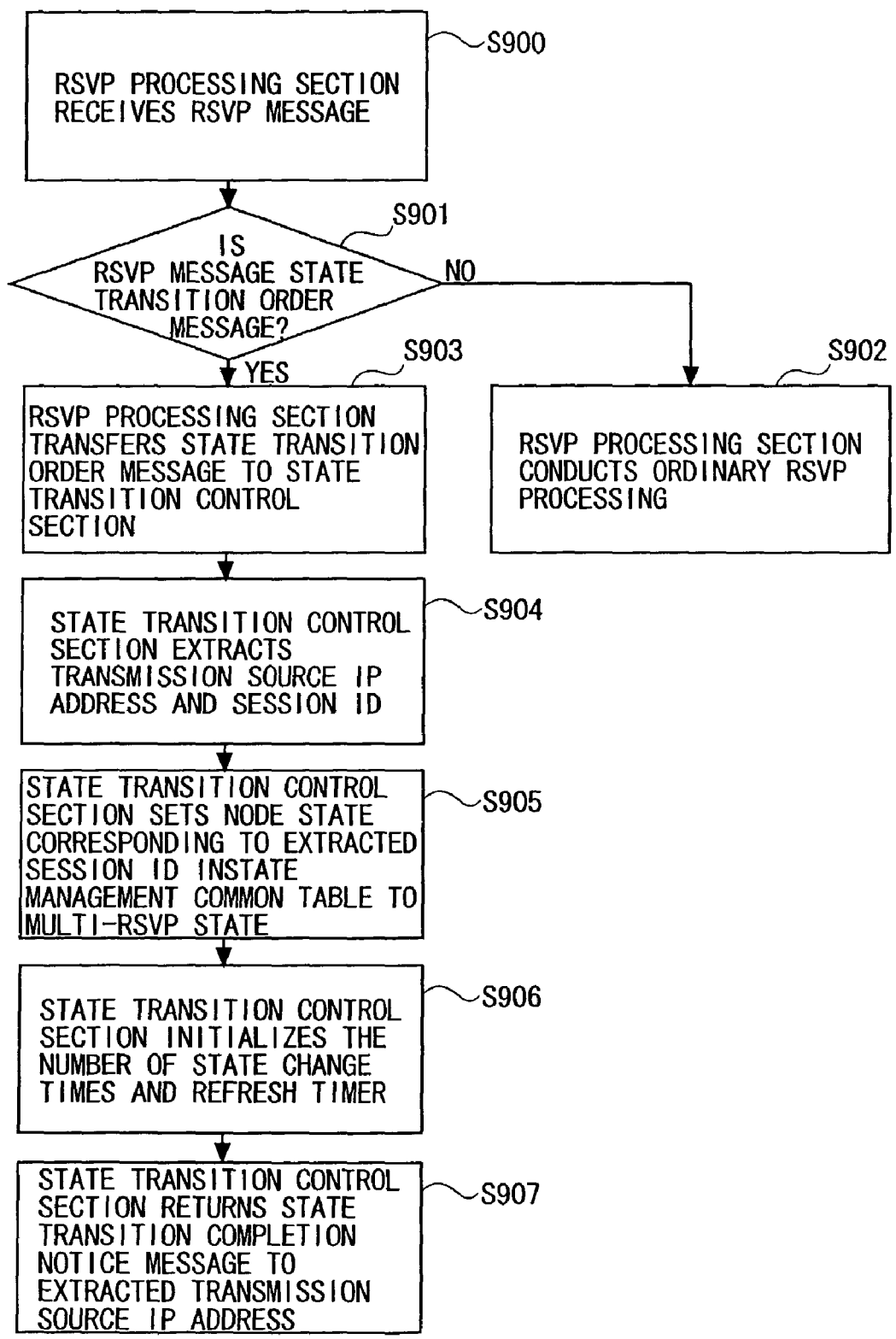
FIG. 11 is a diagram showing an example of a processing flow of conducted by a radio network node when receiving a state transition order message.

FIG. 11 is a diagram showing an example of processing flow conducted when the state transition order message is received by the radio network node 21A. Upon receiving a RSVP message at step S900, the CN side RSVP processing section 604 or the RAN side RSVP processing section 605 determines whether the RSVP message is a state transition order message (step S901).

If at this time the RSVP message is not a state transition order message (S901; NO), then the CN side RSVP processing section 604 or the RAN side RSVP processing section 605 conducts processing on a RSVP message as shown in FIG. 7 or 8 (step S902).

On the other hand, if the RSVP message is a state transition order message (S901; YES), then the RSVP processing section transfers the state transition order message to the state transition control section 606 (step S903).

Upon receiving the state transition order message from the CN side RSVP processing section 604 or the RAN side RSVP processing section 605, the state transition control section 606 extracts a transmission source IP address and a session ID from the state transition order message (step S904).

Subsequently, the state transition control section 606 detects an entry having the same session ID as a session ID extracted from the state management common table 607, and sets a node state corresponding to the session ID of the entry to the multi-RSVP state (step S905).

Subsequently, the state transition control section 606 initializes (resets) the state transition supervisory timer, the number of state change times, the PATH refresh timer and the RESV refresh timer of the detected entry (step S906).

And the state transition control section 606 returns a state transition completion notice message to destination having an IP address extracted at the step S904 (step S907).

<State Transition Order/Completion Notice Message>

The state transition order message and the state transition completion notice message (state transition order/completion notice message) transmitted and received in operations shown in FIGS. 10 and 11 will now be described. Since these messages are introduced according to the present invention, it is necessary to newly define them. At this time, at least four kinds of information, i.e., transmission source address, transmission destination address, message identifier, flow (session) of control subject become necessary.

Figure 12:
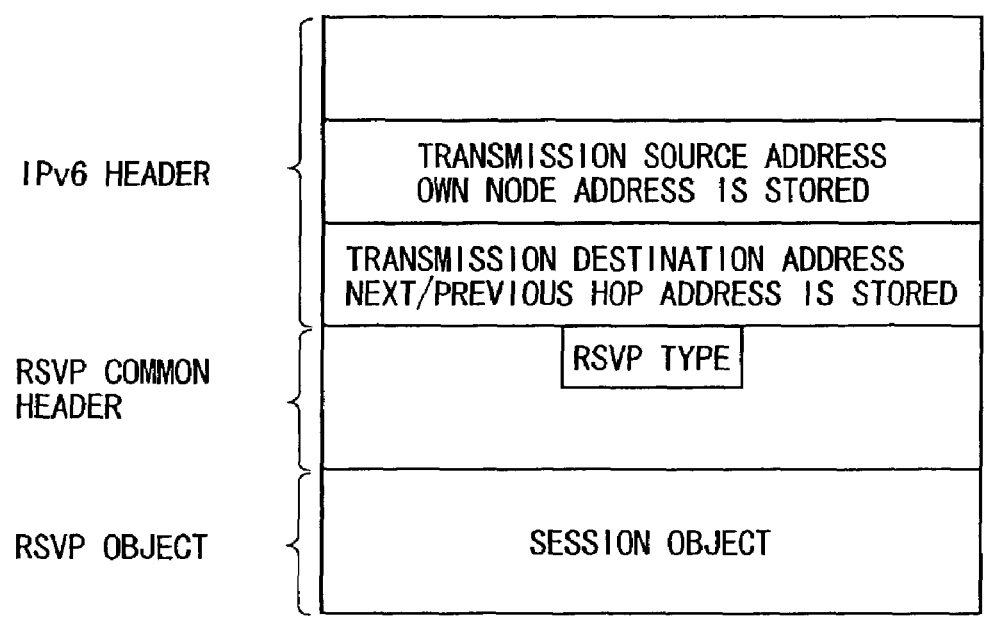
FIG. 12 is a diagram showing an example of a state transition order/response message format using an IPv6 packet.

An example of the state transition order/completion notice message using an IPv6 packet is shown in FIG. 12. In FIG. 12, a format based upon a RSVP message is used as the format of the state transition order/completion notice message. In other words, the state transition order/completion notice message includes an IPv6 header, a RSVP common header, and a RSVP object.

In the state transition order message, an IP address of a radio network node 21A that generates and transmits the state transition order message is stored in the transmission source address in the IPv6 header.

Furthermore, an IP address of a radio network node 21A corresponding to a downstream node or upstream node is stored in the transmission destination address. As the IP address, a next hop address or previous hop address stored in the RSVP soft state corresponding to the pertinent session in the state management common table 607 is used.

To be concrete, when transmitting a state transition order message to an upstream node, the state transition control section 606 uses the previous hop address as the transmission destination address. On the other hand, when transmitting a state transition order message to a downstream node, the state transition control section 606 uses the next hop address as the transmission destination address.

Furthermore, a RSVP type in the RSVP common header is used in order to identify a state transition order message or a state transition response message. To be concrete, two message types, i.e., the state transition order message and the state transition completion notice message, corresponding to the RSVP type region are defined, and a message type corresponding to a message of transmission subject is stored in the RSVP type region.

In order to specify a session that becomes a subject of state transition, a session object is used as the RSVP object.

[Action of Embodiment]

According to the embodiment of the present invention, refresh operations of the resource reservation state based upon the RSVP are conducted independently on the core network side (CN side) and the mobile communication network side (RAN side) having a predetermined radio network node 21A as a boundary.

As a result, the waste of network resources can be suppressed to the minimum by setting the refresh period longer on the CN side having a smaller number of topology alterations, i.e., smaller number of state changes than on the RAN side. On the other hand, on the RAN side where state changes caused by the movement of the mobile terminal 40 are expected to occur frequently, it is possible to make the resource reservation state always follow the movement of the mobile terminal 40 by making the refresh period shorter than that on the CN side, and it becomes possible to ensure a desired communication quality (QoS).

Furthermore, according to the embodiment of the present invention, a point (boundary point, multi-RSVP node) for duplicating the RSVP processing for the flow can be dynamically altered according to the state of the mobile terminal 40.

In other words, in the case where the movement range of the mobile terminal 40 is wide (i.e., in the case where the multi-RSVP node frequently receives RESV messages indicating a reservation state change), the duplication point of RSVP (multi-RSVP node) for the flow is moved to approach the CN 10. On the other hand, in the case where the movement range of the mobile terminal 40 is not so wide (i.e., in the case where the multi-RSVP node rarely receives RESV messages indicating a reservation state change), the duplication point of RSVP (multi-RSVP node) is moved to approach the mobile terminal 40.

In other words, the mobile communication network (RAN) automatically discriminates the most suitable duplication point (multi-RSVP node) and causes a transition of the state of the radio network node 21A, according to the state (such as a position change) of the mobile terminal 40. As a result, the consumption of the network resources can be suppressed to the minimum while ensuring the communication quality to the maximum.

Owing to the functions heretofore described, it is possible for a user of the mobile terminal 40 to be provided with large capacity communication service having a high quality by using optimally reserved resources at any time. On the other hand, it becomes possible to construct infra-facilities for implementing such large capacity communication service with a minimum scale and a minimum cost, by suppressing the waste of network resources.

What is claimed is:

1. A mobile communication system using a resource reservation protocol comprising:
   a mobile communication network connected to a core network implementing a resource reservation protocol;
   a plurality of radio network nodes included in the mobile communication network;

means for reserving network resources for a data flow between a data transmission node and a data reception node that passes through the core network and the mobile communication network, on the basis of a resource reservation protocol; and refresh control means for dividing a region for refreshing a reservation state of network resources concerning the flow into a core network side and a mobile communication network side by taking a predetermined radio network node through which the flow passes as a boundary, and conducting refreshment on the mobile communication network side with a frequency higher than that of refreshment on the core network side, wherein the refresh control means comprises:

a first timer for measuring a first time interval;

a second timer for measuring a second time interval that is shorter than the first time interval;

a first processing section responsive to each elapse of the first time interval measured by the first timer, for generating a refresh message in order to refresh the reservation state of network resources of the core network side and transmitting the generated refresh message to the core network side; and a second processing section responsive to each elapse of the second time interval measured by the second timer, for generating a refresh message in order to refresh the reservation state of network resources of the mobile communication network side and transmitting the generated refresh message to the mobile communication network side, independently of the first processing section.

2. The mobile communication system according to claim 1, wherein the refresh control means conducts refreshment on the mobile communication network side with a period shorter than that on the core network side.

3. The mobile communication system according to claim 1, further comprising boundary node alteration means for altering a boundary node serving as the radio network node that forms the boundary, according to a state change of the mobile communication network with respect to the flow.

4. The mobile communication system according to claim 3, wherein when a number of times the reservation state of network resources is changed on the mobile communication network side obtained by a current boundary node within a predetermined time has exceeded an upper limit value, the boundary node alteration means alters another radio network node that exists on the core network side as compared with the current boundary node, to a boundary node.

5. The mobile communication system according to claim 3, wherein when a number of times the reservation state of network resources is changed on the mobile communication network side obtained by a current boundary node within a predetermined time has become less than a lower limit value, the boundary node alteration means alters another radio network node that exists on the mobile communication network side as compared with the current boundary node, to a boundary node.

6. The mobile communication system according to claim 1, wherein the refresh control means includes a state storage section and a RSVP processing section provided in a radio network node that serves a boundary between the core network side and the mobile communication network side, the state storage section stores a reservation state of network resources of the mobile communication network side for at least the flow, and the RSVP processing section receives a refresh message for refreshing the reservation state of network resources from the mobile communication network side, and if the reservation state of network resources contained in the refresh message does not indicate a change from the reservation state stored in the state storage section, the RSVP processing section stops transfer of the refresh message.

7. The mobile communication system according to claim 6, wherein if the reservation state of network resources contained in the refresh message received from the mobile communication network side indicates a change from the reservation state stored in the state storage section, the RSVP processing section updates the reservation state stored in the state storage section by using the reservation state of network resources contained in the refresh message, generates a refresh message for refreshing the reservation state of network resources of the core network side including the updated reservation state, and transmits the generated refresh message to the core network side.

8. The mobile communication system according to claim 7, wherein the radio network node that serves a boundary between the core network side and the mobile communication network side further comprises:

a state supervisory section;

a state supervisory timer for measuring a predetermined time interval;

a state change number of times storage section for storing a number of times the reservation state is changed by a plurality of refresh messages received from the mobile communication network side while the state supervisory timer is measuring the predetermined time interval; and a threshold storage section for storing a threshold for the number of times the reservation state is changed, wherein whenever the state supervisory timer has measured elapse of the predetermined time interval, the state supervisory section determines whether the number of times of change stored in the state change number of times storage section exceeds the threshold stored in the threshold storage section, and wherein if the number of times of change exceeds the threshold, the state supervisory section issues a message and transmit the message to a different radio network node existing on the core network side as compared with the current radio network node in order to order the different radio network node to become the boundary instead of the current radio network node.

9. The mobile communication system according to claim 7, wherein the radio network node that serves a boundary between the core network side and the mobile communication network side further comprises:

a state supervisory section;

a state supervisory timer for measuring a predetermined time interval;

a state change number of times storage section for storing a number of times the reservation state is changed by a plurality of refresh messages received from the mobile communication network side while the state supervisory timer is measuring the predetermined time interval; and a threshold storage section for storing a threshold for the number of times the reservation state is changed, wherein whenever the state supervisory timer has measured elapse of the predetermined time interval, the state supervisory section determines whether the number of times of change stored in the state change number of times storage section is less than the threshold stored in the threshold storage section, and wherein if the number of times of change is less than the threshold, the state supervisory section issues a message and transmit the message to a different radio network node existing on the mobile communication network side as compared with the current radio network node in order to order the different radio network node to become the boundary instead of the current radio network node.

* * * * *